United States Patent
Lin et al.

(10) Patent No.: US 8,458,299 B2
(45) Date of Patent: Jun. 4, 2013

(54) METADATA MANAGEMENT METHOD FOR NAS GLOBAL NAMESPACE DESIGN

(75) Inventors: Wujuan Lin, Singapore (SG); Shoji Kodama, Singapore (SG); Naoki Utsunomiya, Tokyo (JP); Hitoshi Kamei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 612 days.

(21) Appl. No.: 12/726,337

(22) Filed: Mar. 17, 2010

(65) Prior Publication Data

US 2011/0231524 A1      Sep. 22, 2011

(51) Int. Cl.
   *G06F 15/173* (2006.01)
(52) U.S. Cl.
   USPC .......................................... 709/220; 707/821
(58) Field of Classification Search
   None
   See application file for complete search history.

(56) References Cited

U.S. PATENT DOCUMENTS

| | | | |
|---|---|---|---|
| 2003/0097454 A1 | 5/2003 | Yamakawa | |
| 2004/0122917 A1* | 6/2004 | Menon et al. | 709/219 |
| 2006/0271598 A1 | 11/2006 | Wong | |
| 2007/0198458 A1 | 8/2007 | Pudipeddi | |
| 2008/0109450 A1* | 5/2008 | Clark et al. | 707/10 |
| 2009/0177860 A1* | 7/2009 | Zhu et al. | 711/173 |
| 2009/0222544 A1* | 9/2009 | Xiao et al. | 709/223 |
| 2010/0114889 A1* | 5/2010 | Rabii et al. | 707/737 |
| 2010/0161657 A1* | 6/2010 | Cha et al. | 707/770 |

* cited by examiner

Primary Examiner — Ario Etienne
Assistant Examiner — Clayton R Williams
(74) Attorney, Agent, or Firm — Brundidge & Stanger, P.C.

(57) ABSTRACT

A global namespace (GNS) is constructed across heterogeneous network-attached storage (NAS) devices by organizing metadata servers into a cluster layer having cluster nodes and a consistent hashing overlay layer having overlay nodes. The global namespace is distributed based on workload at the cluster and overlay nodes, and a portion of the GNS namespace may be migrated from one layer to the other. Cluster nodes may be added to the cluster layer, overlay nodes may be added to the consistent hashing overlay layer. Further, a cluster node may become an overlay node or an overlay node may become a cluster node. To access the global namespace, a request for namespace metadata managed by a cluster node is serviced by the cluster node, but if the requested namespace metadata have been migrated to the consistent hashing overlay layer, the cluster node will forward the request to the responsible overlay node for servicing.

16 Claims, 41 Drawing Sheets

| Hash Value | GUID | GNS Path | IP Address of NAS | Path within NAS Share | Type | ACL | Others |
|---|---|---|---|---|---|---|---|
| 076 | 0320 | /B/B2 | 192.168.2.22 | S_B/B2 | Directory | All:Read/Write | Directory entries |
| 076 | 0322 | /B/B2/b21 | 192.168.2.22 | S_B/B2/b21 | File | All:Read | |
| 076 | 0333 | /B/B2/b22 | 192.168.2.22 | S_B/B2/b22 | File | All:Read/Write | |
| --- | | | | | | | |

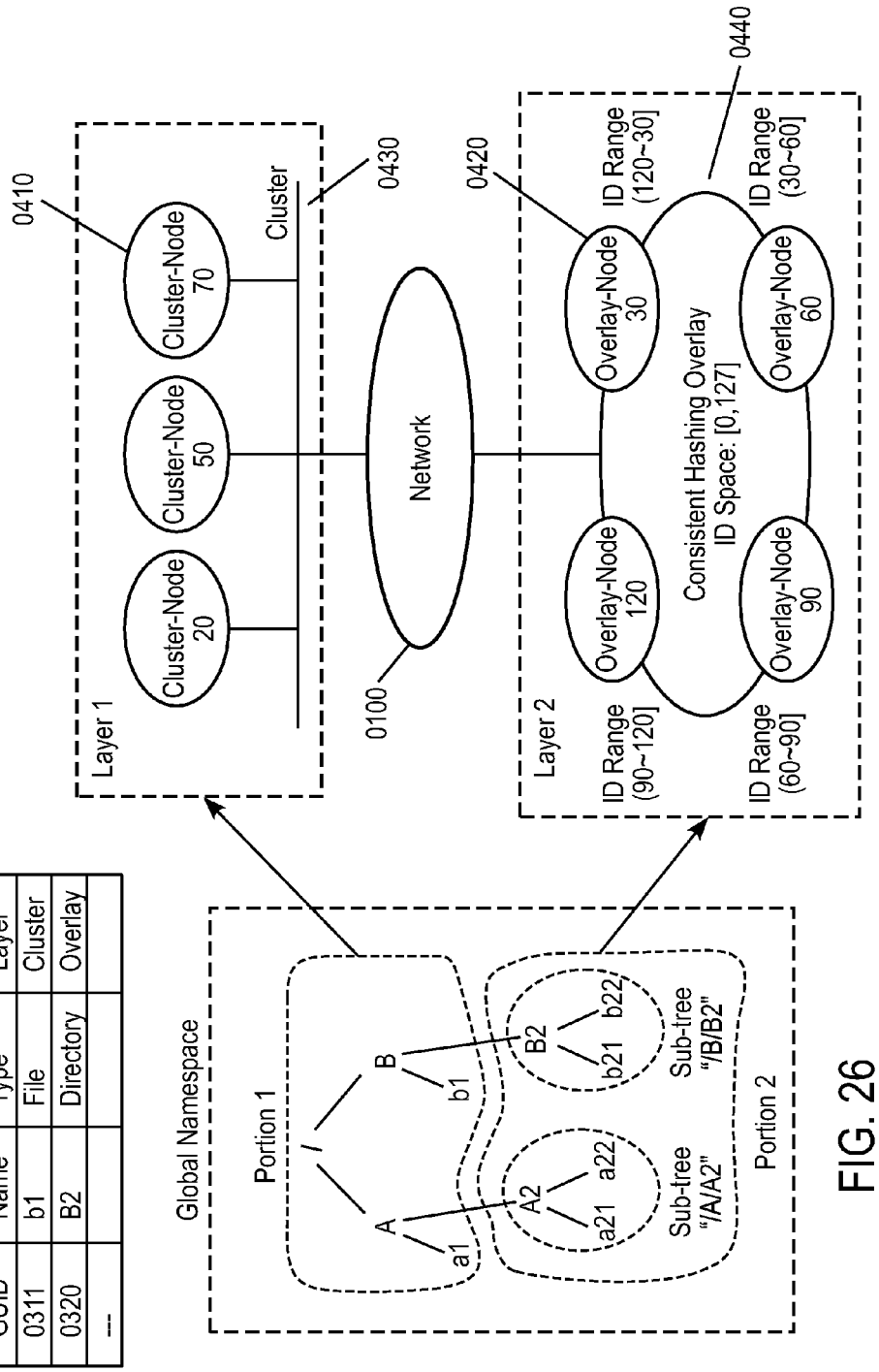

METADATA MANAGEMENT METHOD FOR NAS GLOBAL NAMESPACE DESIGN

BACKGROUND OF THE INVENTION

The rapid growth of file-based information, and today's fast expanding and diverse business environment, have led to isolated storage islands within organizations. Various NAS (Network-Attached Storage) devices coexist with different performances and different capacities, and even from different vendors, making it very difficult to manage the storage and access the information stored therein. On one hand, end users need to know where files are located and to map/mount the share folders in order to access files from different NAS devices. On the other hand, system administrators need to spend a great deal of time reconfiguring the system, optimizing the storage utilization, and/or migrating the data, due to various needs. These are complicated tasks and may cause system downtime and user interruption, which are very costly.

A Global Namespace (GNS) that can provide a single access point with location transparent file service to end users and allow system administrators to more efficiently utilize the storage, is therefore proposed in the prior art. However, there are several essential requirements for the GNS design, which are not trivial to address simultaneously. For example, the GNS design has to continue a customer's existing search across heterogeneous NASs. The GNS design should not require customers to stop using their existing NASs in order to implement the GNS solution. The GNS design also should have no limitation on scalability, to accommodate daily-growing data and performance. In addition, the GNS design has to support file-level virtualization to enable File Lifecycle/Retention Management, enabling the system to migrate one single file, instead of an entire file system, from one location to another without affecting how the users view and access the file.

Existing GNS solutions found in the prior art, which can construct a GNS across heterogeneous NAS devices, fall into two categories: Full Namespace Mapping (see United States pre-grant publication Nos. US 2003/0097454 and US 2006/0271598) and Static Namespace Partitioning (US 2007/0198458).

In a Full Namespace Mapping solution, dedicated metadata servers are used to virtualize a global namespace across heterogeneous NAS devices. The entire global namespace is maintained and synchronized among all metadata servers. As all GNS-to-physical mapping information is managed by the metadata servers, this solution has the flexibility to store/migrate any file anywhere in the system by simply changing the metadata mapping information. However, one problem of the Full Namespace Mapping solution is that it has limited scalability when the namespace grows, as the synchronization workload across all the metadata servers for any update on the GNS consumes a large amount of system resources such as network bandwidth and CPU cycles.

In the Static Namespace Partitioning solution, the GNS namespace above the NAS shares is maintained and synchronized among the metadata servers, while the GNS namespaces below the NAS shares are managed by the NAS devices individually. By doing so, the synchronization workload among the metadata servers is minimized, and therefore scalability is improved. However, this solution does not support file-level virtualization. It is not possible to migrate a file from one NAS to another without changing the GNS namespace.

As such, both Full Namespace Mapping and Static Namespace Partitioning solutions are not able to simultaneously address all of the aforementioned requirements of GNS design. Simply switching from Full Namespace Mapping to Static Namespace Partitioning, when the namespace grows, may solve the scalability issue, but will also lose the file-level virtualization feature. Therefore, a global namespace across heterogeneous NAS devices which supports file-level virtualization but has no scalability limitation is highly desired.

SUMMARY OF THE INVENTION

The present invention includes construction of a GNS across heterogeneous NAS devices, by organizing metadata servers into two layers: a cluster layer and a consistent hashing overlay layer, and dynamic adjustment of the portion of the GNS namespace to be managed by each layer, based on the workload of the metadata servers.

There are two types of metadata servers in the system: cluster nodes at the cluster layer and overlay nodes at the consistent hashing overlay layer. The cluster nodes cooperatively form the cluster layer, where the GNS namespace managed by a cluster node is synchronized across all cluster nodes in the cluster. The overlay nodes cooperatively form the consistent hashing overlay layer, where both the GNS namespace and overlay nodes are hashed to the same ID space, organized into a logical ring where the smallest ID succeeds the largest ID. The GNS namespace is managed by the overlay nodes in a distributed manner. More specifically, a GNS namespace entry is managed by an overlay node responsible for it, whose node ID is numerically closest clockwise in the ID space to the hash value of the GNS namespace entry.

To construct the global namespace, a cluster node first creates the GNS hierarchy above the share folders of the NAS devices, and then constructs the GNS hierarchy under the share folders by discovering the files in the share folders of NAS devices. The GNS namespace is synchronized across all the cluster nodes in the cluster layer.

To redistribute the global namespace, based on the workload information at the cluster nodes and overlay nodes, a cluster node may initiate the processing to add one or more cluster nodes to the cluster layer, or to add one or more overlay nodes to the consistent hashing overlay layer, or to migrate a portion of the GNS namespace from the cluster layer to the consistent hashing overlay layer, or to migrate a portion of the GNS namespace from the consistent hashing overlay layer to the cluster layer. Alternatively, the above processes may be initiated by a cluster node and each overlay node. Further, a cluster node may leave the cluster layer and become an overlay node at the consistent hashing overlay layer, or an overlay node may leave the consistent hashing overlay layer and become a cluster node at the cluster layer.

To access the global namespace, a request is first submitted to a cluster node. If the requested namespace metadata are managed by the cluster node, the cluster node can then serve the request. Otherwise, if the requested namespace metadata have been migrated to the consistent hashing overlay layer, the cluster node will forward the request to the responsible overlay node at the consistent hashing overlay layer. The responsible overlay node will then serve the request.

BRIEF DESCRIPTION OF THE DRAWINGS

FIG. 24 shows an example of a structure of metadata information stored in a metadata repository at an overlay node.

FIG. 25 shows an example of directory entries maintained at a cluster node after a sub-directory tree is migrated to a consistent hashing overlay layer.

FIG. 26 illustrates an example of GNS namespace distribution.

DETAILED DESCRIPTION OF THE PREFERRED EMBODIMENTS

Figure 1:
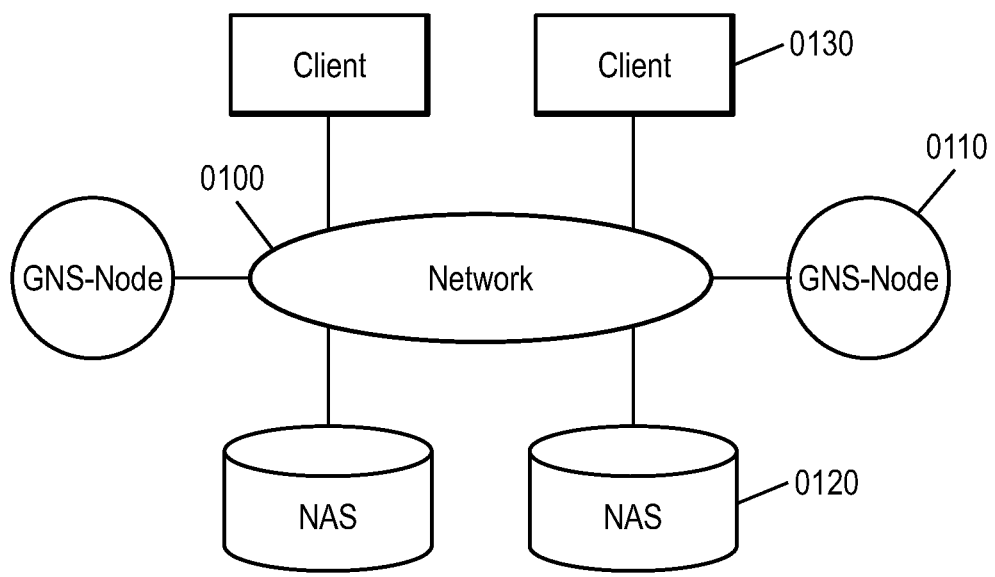
FIG. 1 is an exemplary diagram of an overall system.

FIG. 1 is an exemplary diagram of an overall system. The system consists of multiple GNS-Nodes 0110, NAS devices 0120, and Clients 0130 connected to a Network 0100 (such as a local/wide area network). GNS-Nodes 0110 are dedicated metadata servers in this example, and manage the GNS namespace. NAS devices 0120 are heterogeneous NAS devices where user files are stored. Clients 0130 are devices (such as PCs) that utilize the Global Namespace service to access data in the system.

Figure 2:
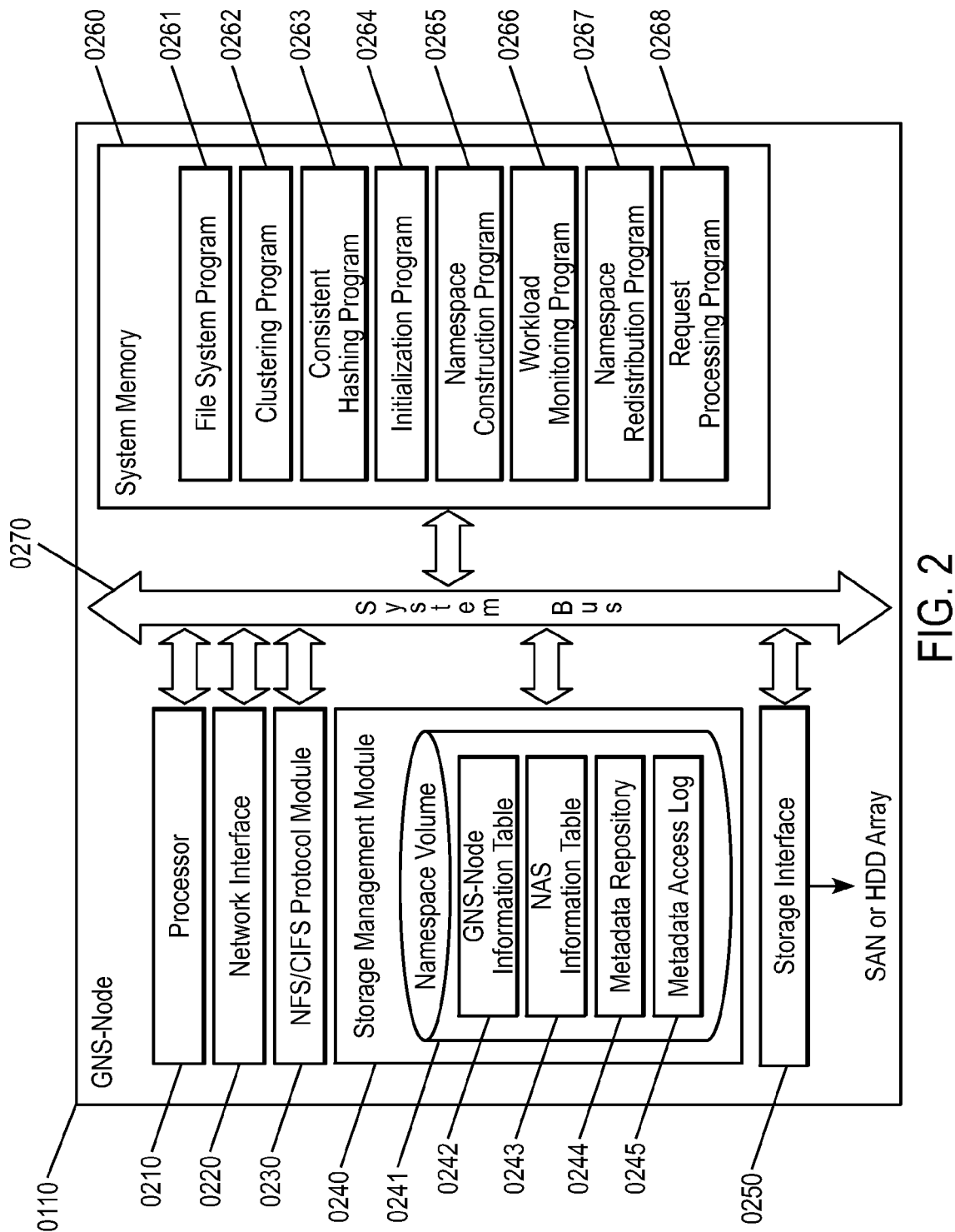
FIG. 2 is a block diagram illustrating components within a GNS-Node.

FIG. 2 is a block diagram illustrating components within a GNS-Node 0110. A GNS-Node may consist of, but is not limited to, a processor 0210, a network interface 0220, a NFS/CIFS (Network File System/Common Internet File System) protocol module 0230, a storage management module 0240, a storage interface 0250, a system memory 0260, and a system bus 0270. The system memory 0260 further includes a file system program 0261, a clustering program 0262, a consistent hashing program 0263, an initialization program 0264, a namespace construction program 0265, a workload monitoring program 0266, a namespace redistribution program 0267, and a request processing program 0268, which are computer programs executed by the processor 0210 to manage the global namespace. The storage interface 0250 manages the storage from a storage area network (SAN) or an internal hard disk drive (HDD) array, and provides raw data storage to the storage management module 0240. The storage management module 0240 organizes the raw data storage into a storage volume, referred to as a namespace volume 0241, where the global namespace information is stored, the namespace volume 241 including without limitation a GNS-node information table 0242, a NAS information table 0243, a metadata repository 0244, and a metadata access log 0245. The network interface 0220 connects the GNS-node 0110 to the network 0100 and is used for communication with other GNS-nodes 0110, NAS devices 0120, and clients 0130. The NFS/CIFS protocol module 0230 implements both the client and server functions of the NFS/CIFS protocol to send NFS/CIFS requests to NAS devices 0120, and to serve the NFS/CIFS requests from clients 0130. The processor 0210 represents a central processing unit that executes the computer programs. Commands and data communicated among the processor and other components are transferred via the system bus 0270.

Figure 3:
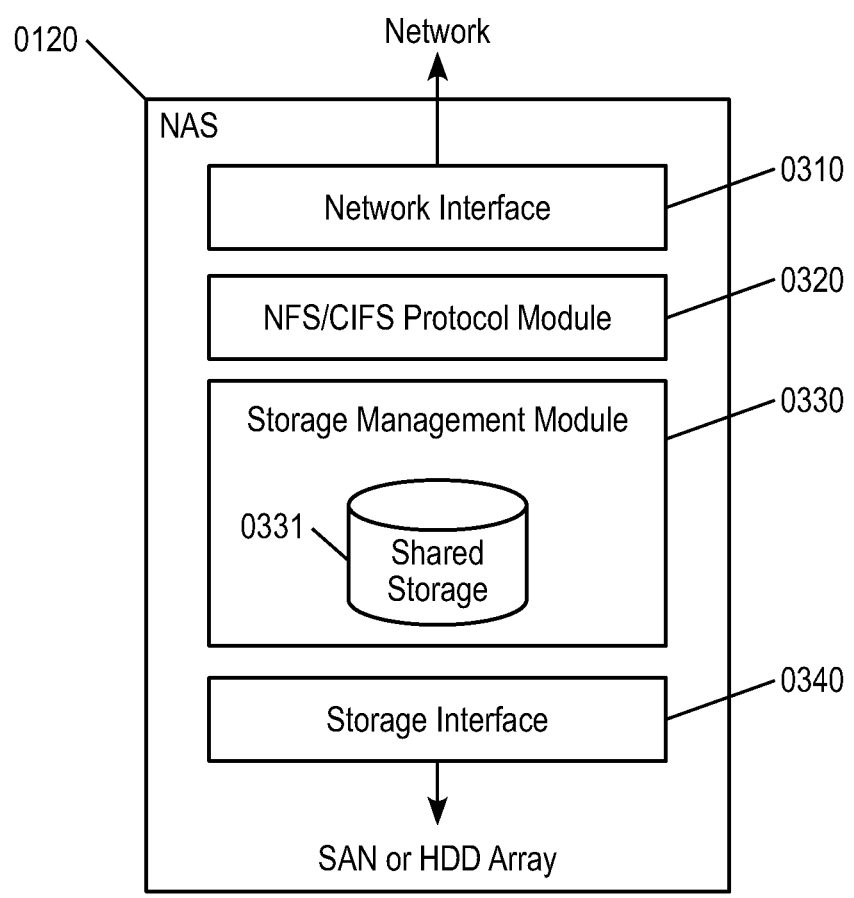
FIG. 3 is a block diagram illustrating the components within a NAS device.

FIG. 3 is a block diagram illustrating the components within a NAS device 0120. A NAS device may consist of, but is not limited to, a network interface 0310, a NFS/CIFS protocol module 0320, a storage management module 0330, and a storage interface 0340. The network interface 0310 connects the NAS device 0120 to the network 0100 and is used for communication with GNS-nodes 0110. The NFS/CIFS protocol module 0320 implements the server functions of the NFS/CIFS protocol, and services the NFS/CIFS requests from GNS-nodes 0110. The storage interface 0340 manages the storage from a storage area network (SAN) or an internal hard disk drive (HDD) array, and provides raw data storage to the storage management module 0330. The storage management module 0330 organizes the raw data storage into a storage volume, referred to as share storage 0331. The user files are stored in the share storage 0331 and exported for access through the NFS/CIFS protocol module 0320.

Figures 4, 5:
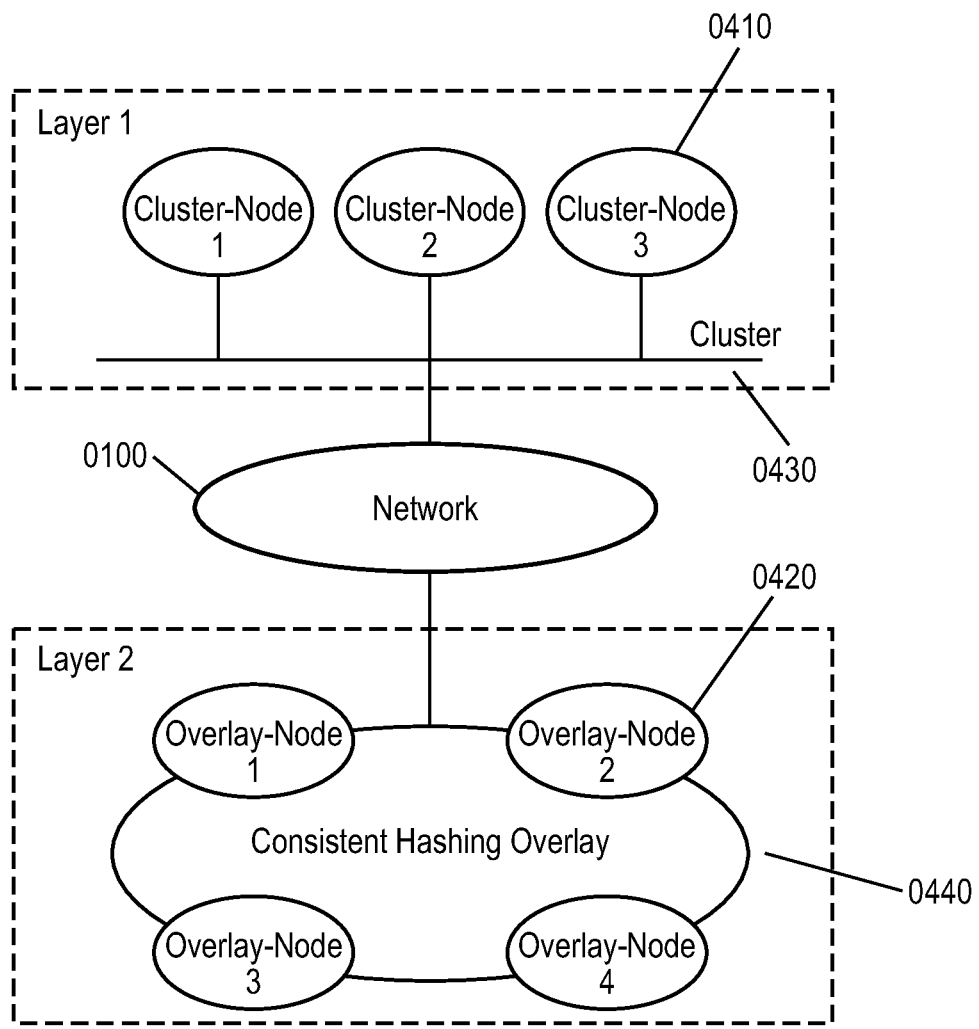
FIG. 4 shows a high level overview of a logical architecture of GNS-nodes.
FIG. 5 is a table that shows an example of mapping an IP address to a node ID.

FIG. 4 shows a high level overview of a logical architecture of the GNS-nodes 0110, where the GNS-nodes 0110 are organized into two layers: a cluster layer 0430 (layer 1) and a consistent hashing overlay layer 0440 (layer 2). GNS-nodes 0110 in the cluster layer 0430 are referred to as cluster nodes 0410, and GNS-nodes 0110 in the consistent hashing overlay layer 0440 are referred to as overlay nodes 0420, hereafter. The cluster nodes 0410 execute the clustering program 0262 and cooperatively form the cluster layer 0430. The GNS namespace managed by a cluster node 0410 is synchronized across all the cluster nodes 0410 in the cluster layer 0430. The overlay nodes 0420 execute the consistent hashing program 0263 and cooperatively form the consistent hashing overlay layer 0440. In the consistent hashing overlay layer 0440, both the GNS namespace and overlay nodes 0420 are hashed to the same ID space, organized into a logical ring where the smallest ID succeeds the largest ID. A GNS namespace entry is assigned to a responsible overlay node 0420 whose Node ID is numerically closest clockwise in the ID space to the hash value of the GNS namespace entry.

A cluster node 0410 or an overlay node 0420 obtains its node ID by using the hashing function implemented in the consistent hashing program 0263 to calculate the hash value of its IP address. With a collision-free hash function, such as 128-bit or 160-bit SHA-1, the node ID assigned to a cluster node 0410 or an overlay node 0420 will be globally unique.

FIG. 5 is a table that shows an example of mapping an IP address 0510 to a node ID 0530, by calculating the hash value 0520 of the IP address. In this example, an 8-bit ID space [0-127] is illustrated. It should be noted that in this description, decimal ID space, instead of binary bits, is used to represent the Node ID, for simplicity of explanation. As in the example, the hash value of an overlay node's IP address, 192.168.1.10, is calculated as 10, and therefore, the node ID of the overlay node 0420 is assigned to 10.

Figure 6:
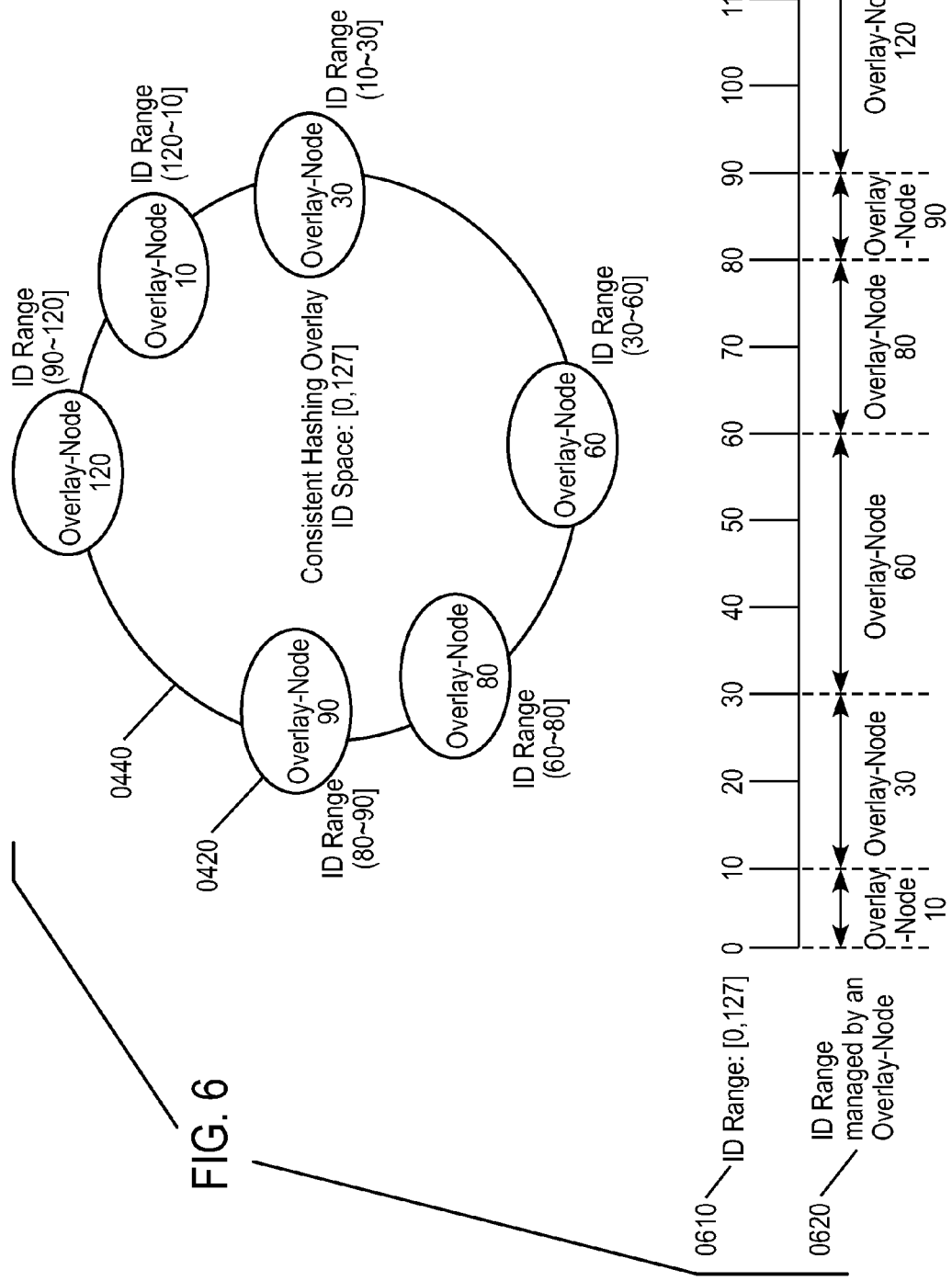
FIG. 6 shows an ID range managed by each overlay node in a consistent hashing overlay layer.

Each overlay node 0420 in the consistent hashing overlay layer 0440 is responsible for a range of ID space that has no overlap with the ID ranges managed by other overlay nodes 0420. FIG. 6 shows the ID range 0620 managed by each overlay node 0420 in the consistent hashing overlay layer 0440 with ID space [0,127] 0610. It should be noted that the ID space 0610 forms a circle, and therefore the ID range 0620 managed by the overlay node 0420 with node ID 120 is (90~120], the ID range 0620 managed by the overlay node 0420 with node ID 10 is (120~10], and the ID range 0620 managed by the overlay node 0420 with node ID 30 is (10~30], and so on.

Figure 7:
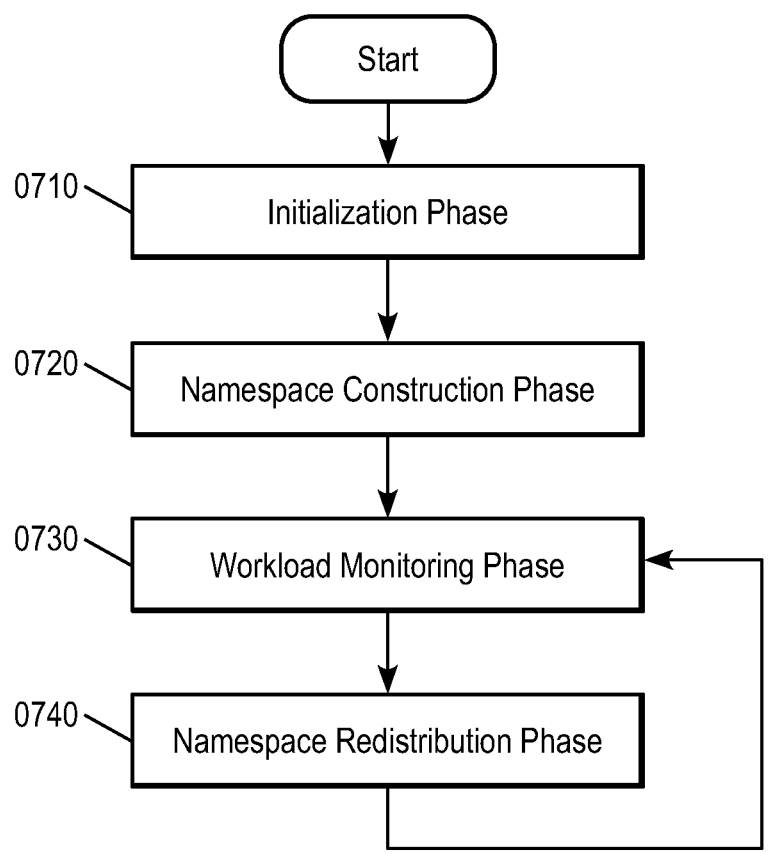
FIG. 7 is a flow diagram illustrating exemplary steps to construct the GNS and distribute the GNS namespace to cluster nodes and overlay nodes.

FIG. 7 is a flow diagram illustrating exemplary steps to construct the GNS and distribute the GNS namespace to the cluster nodes 0410 and the overlay nodes 0420. In Step 0710 (Initialization Phase), cluster nodes 0410 join the cluster layer 0430. In Step 0720 (Namespace Construction Phase), the cluster node with the smallest node ID creates the GNS namespace above the share folders in NAS devices 0120, and discovers the NAS devices 0120 to construct the GNS namespace under the share folders. After Step 0720, the system repeats Step 0730 (Workload Monitoring Phase) and Step 0740 (Namespace Redistribution Phase) to monitor the namespace access workload and redistribute the GNS namespace to the cluster nodes 0410 and overlay nodes 0420 based on the workload information. These steps will be further described hereafter.

Figure 8:
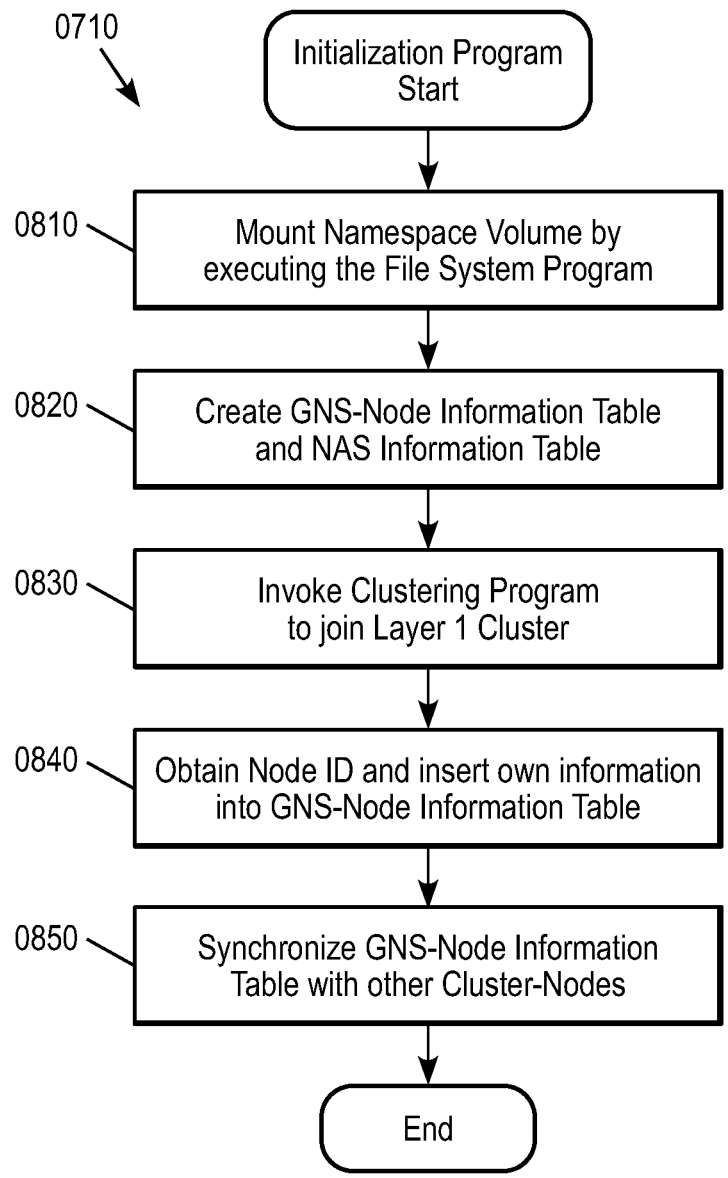
FIG. 8 is an example of a flow diagram of an initialization phase.

FIG. 8 is a flow diagram of an example of the initialization phase (Step 0710). A cluster node 0410 executes the initialization program 0264 during the initialization phase. In Step 0810, the cluster node 0410 mounts the namespace volume 0241 by executing the file system program 0261, so that the global namespace information can be stored into and retrieved from the namespace volume 0241. In Step 0820, the cluster node 0410 creates the GNS-node information table 0242 and NAS information table 0243 in the namespace volume 0241. In Step 0830, the cluster node 0410 invokes the clustering program 0262 to join the cluster layer 0430. In Step 0840, the cluster node 0410 obtains its node ID 0530 by calculating the hash value 0520 of its IP address 0510, using the hashing function implemented in the consistent hashing program 0263. The cluster node 0410 then inserts its own information, such as the node ID thus obtained and its IP Address, into GNS-node information table 0242. In Step 0850, the cluster node 0410 synchronizes GNS-node information table 0242 with other cluster nodes through the clustering program 0262. As a result, all the cluster nodes 0410 in the cluster layer 0430 have the same information in their GNS-node information tables 0242.

Figure 9:
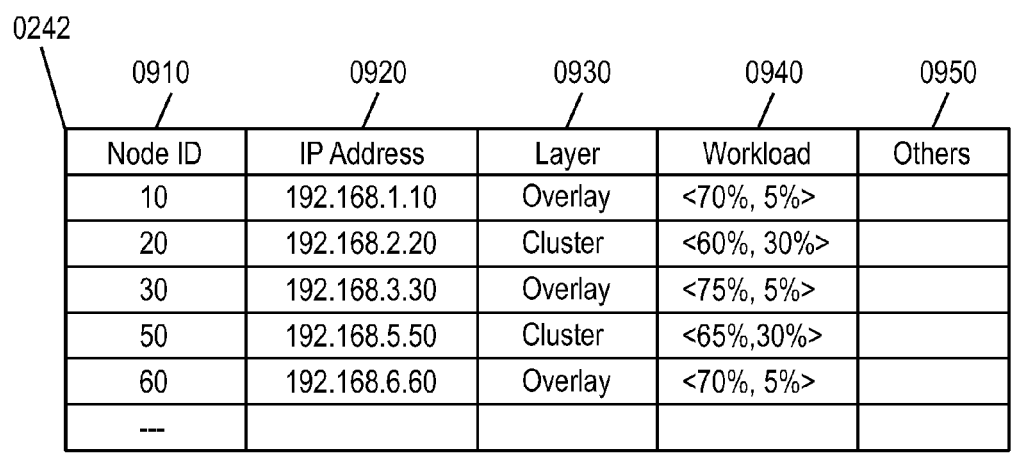
FIG. 9 shows an example of the structure of a GNS-node information table.

FIG. 9 shows an example of the structure of a GNS-node information table 0242. The GNS-node information table 0242 consists of, but is not limited to, five columns, including node ID 0910, IP address 0920, layer 0930, workload 0940, and others 0950. The node ID 0910 is the hash value of the IP address 0920 for the node. Layer 0930 is either "cluster" or "overlay". "Cluster" means that the GNS-node 0110 is a cluster node 0410 in the cluster layer 0430, and "overlay" means that the GNS-node 0110 is an overlay node 0420 in the consistent hashing overlay layer 0440. Others 0950 are used to store other meaningful information about the GNS-node 0110 (for example, storage capacity).

Workload 0940 is a percentage number pair, defined as <number of total requests/max number of requests, number of synchronization requests/max number of requests>, where "number of total requests" means the total number of namespace access requests served by the GNS-node 0110 during a predefined time period, "number of synchronization requests" means the total number of namespace synchronization requests served by the GNS-node 0110 during the predefined time period, and "max number of requests" means the maximum number of namespace access requests that can be served by the GNS-node 0110 within the predefined time period. The first percentage number is referred to as total workload, and the second percentage number is referred to as synchronization workload, hereafter. The synchronization workload is a subset of the total workload.

Figure 10:
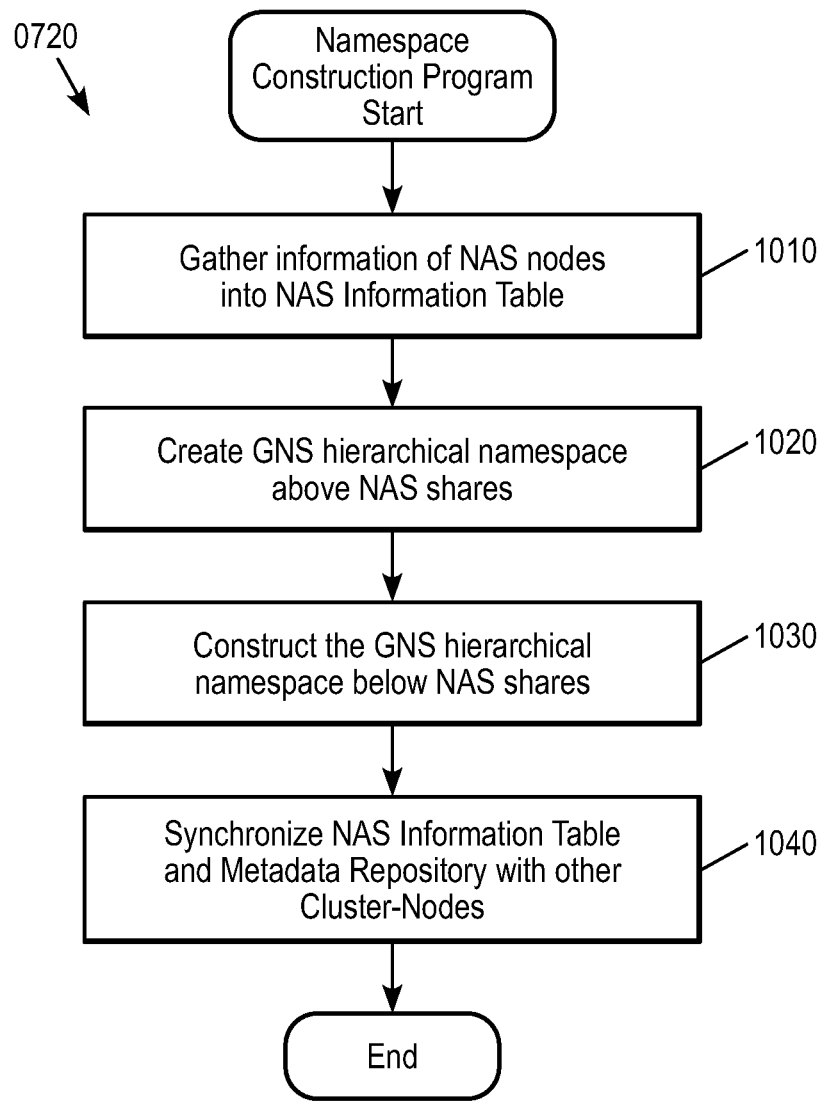
FIG. 10 is an example of a flow diagram of a namespace construction phase.
Figure 11:
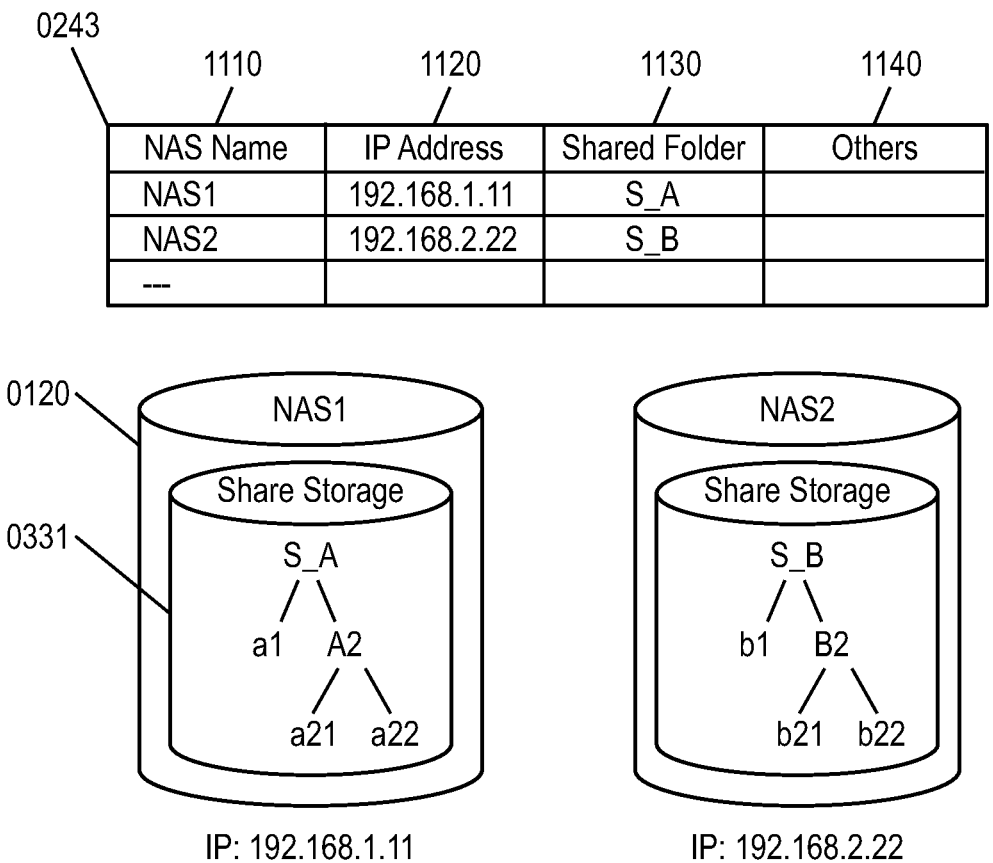
FIG. 11 shows an example illustrating NAS information gathered in a NAS information table.

FIG. 10 is an example of a flow diagram of the namespace construction phase (Step 0720). The namespace construction phase is carried out by the cluster node 0410 which has the smallest node ID in the GNS-node information table 0242 (in the example in FIG. 9, the cluster node with Node ID 20), by executing the namespace construction program 0265. In Step 1010, the cluster node 0410 gathers the information of NAS devices 0120 into the NAS information table 0243. FIG. 11 shows an example illustrating the NAS information gathered in the NAS information table 0243. In this example, there are two NAS devices 0120, NAS1 and NAS2, having IP address 192.168.1.11 and 192.168.2.22, respectively. NAS1 has a share folder S_A and NAS2 has a share folder S_B. All of the above information is gathered into the NAS information table 0243 which consists of, but is not limited to, four columns, NAS name 1110, IP address 1120, share folder 1130, and others 1140 (for example, storage capacity).

Figure 12:
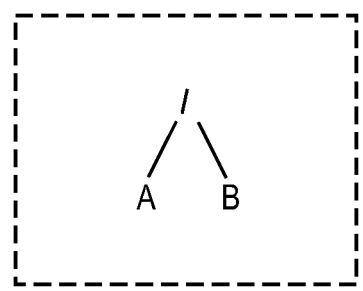
FIG. 12 shows an example of a GNS hierarchical namespace above NAS shares.

Referring back to FIG. 10, in Step 1020, the cluster node 0410 creates the GNS hierarchical namespace above the share folders based on the information gathered in the NAS information table 0243 by creating corresponding namespace entries in the metadata repository 0244. FIG. 12 shows one possible implementation by creating the GNS root directory "/" and one sub-directory ("/A" and "/B" in this example) for each share folder 1130 in the NAS information table 0243. Of course, a more meaningful and complicated GNS hierarchy with more than two levels can be created in Step 1020. The example shown in FIG. 12 is for simplicity of explanation.

Figure 13:
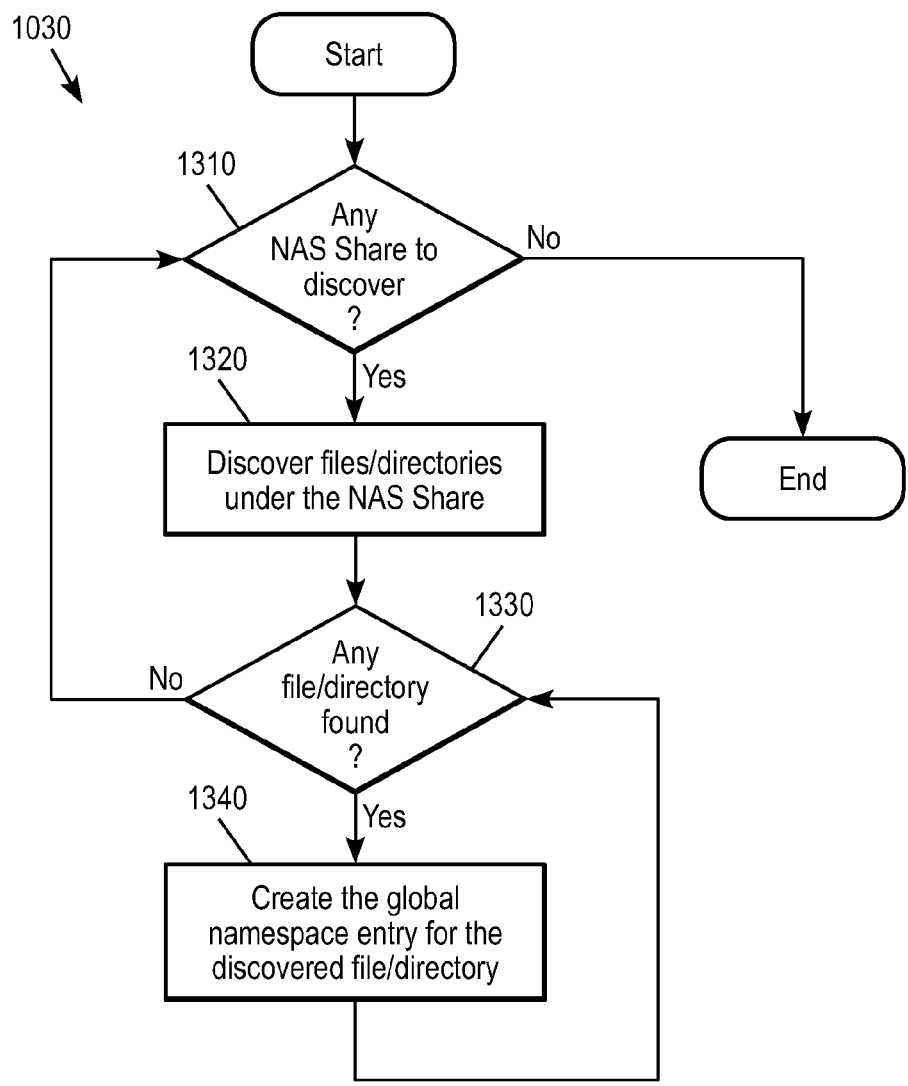
FIG. 13 is a flow diagram illustrating exemplary steps for constructing a GNS hierarchical namespace below NAS shares.

Referring back to FIG. 10 again, in Step 1030, the cluster node 0410 constructs the GNS hierarchical namespace below the NAS shares. FIG. 13 is a flow diagram illustrating exemplary steps constituting Step 1030. In Step 1310, the cluster node 0410 checks whether any NAS share needs to be discovered to construct the GNS hierarchical namespace below the NAS share. If YES, in Step 1320, the cluster node 0410 discovers the files and directories under the NAS share in the corresponding NAS device 0120 with the IP address 1120. In Step 1330, the cluster node 0410 checks whether any file or directory is found (or discovered). For each file or directory found, in Step 1340, the cluster node 0410 creates the global namespace entry in the metadata repository 0244 by combining the GNS path information of the parent directory. For example, for the directory "S_B/B2" discovered in NAS2 with IP address 192.168.2.22, as shown in FIG. 11, a GNS namespace entry "/B/B2" will be created as the GNS path for the parent directory "S_B" is "/B". Similarly, for the file "S_B/B2/b22" discovered in NAS2, a GNS namespace entry "/B/B2/b22" will be created as the GNS path for the parent directory "S_B/B2" is "/B/B2". The cluster node 0410 repeats Steps 1310, 1320, 1330 and 1340, until there are no more NAS shares to discover.

Figure 14:
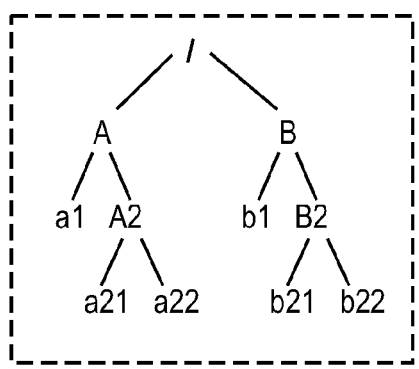
FIG. 14 shows an example of the constructed GNS hierarchy.

FIG. 14 shows an example of the GNS hierarchy constructed after Step 1030, given the NAS devices 0120, NAS1 and NAS2, in FIG. 11, and the GNS hierarchy above NAS shares created in FIG. 12.

Figure 15:
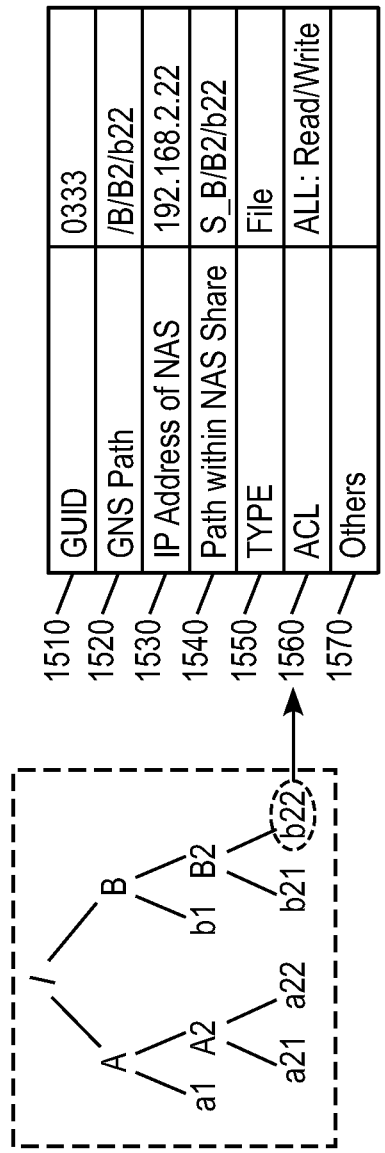
FIG. 15 shows an example of a structure of metadata information stored in a metadata repository at a cluster node.

It should be noted that the metadata information of a namespace entry created in the metadata repository 0244 at a cluster node 0410 is stored in the manner of inode information in a traditional file system. FIG. 15 shows an example of the structure of metadata information (for file "/B/B2/b22" as in the example) stored in the metadata repository 0244 at a cluster node 0410. The metadata information consists of, but is not limited to, GUID 1510, GNS path 1520, IP address of NAS 1530, path within NAS share 1540, type 1550, ACL 1560, and others 1570. The GUID 1510 is a global unique ID, like an inode number, assigned for the namespace entry. The GNS path 1520 is the absolute path in the GNS hierarchy. The IP address of NAS 1530 and the path within NAS share 1540 further describe the location of the corresponding file/directory within a NAS device 0120. The type 1550 is either "file" or "directory". The ACL 1560 is the access right of the file/directory (in the example, all users have read and write access right). The others 1570 are used to store other useful information about the file/directory (for example, the time of creation or size).

Figure 16:
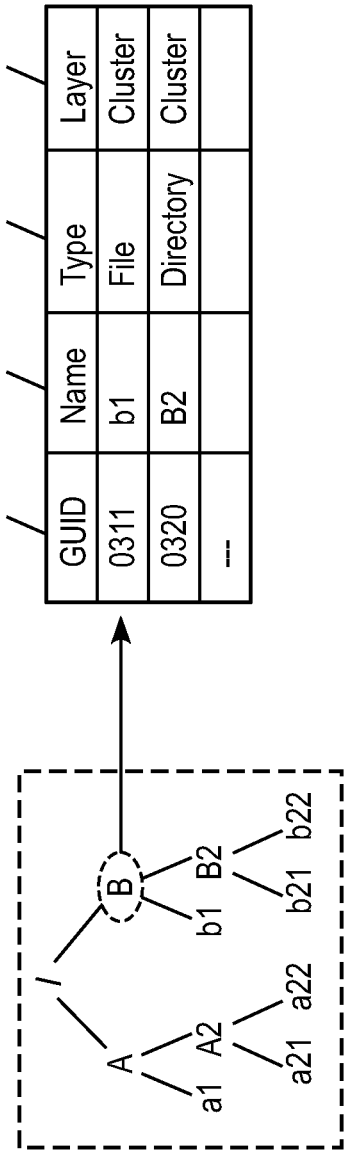
FIG. 16 shows an example of a structure of a directory entry in a GNS namespace entry.

Further, for a GNS namespace entry with "directory" as type 1550, the information of the sub-files and sub-directories under the GNS namespace entry is also stored as the content of the directory, referred to as directory entries. FIG. 16 shows an example of the structure of a directory entry, which consists of, but is not limited to, GUID 1610, name 1620, type 1630, and layer 1640. The GUID 1610 is the same as the GUID 1510. The name is the sub-file/directory name. The type 1630 is either "file" or "directory". The layer 1640 is either "cluster" or "overlay". "Cluster" means that the metadata information of the sub-file/directory is currently managed at the cluster layer 0430. "Overlay" means that the metadata information of the sub-file/directory is currently managed at the consistent hashing overlay layer 0440.

Referring back to FIG. 10 again, in Step 1040, the cluster node 0410 synchronizes the NAS information table 0243 and the metadata repository 0244 with those of other cluster nodes 0410.

Figure 17:
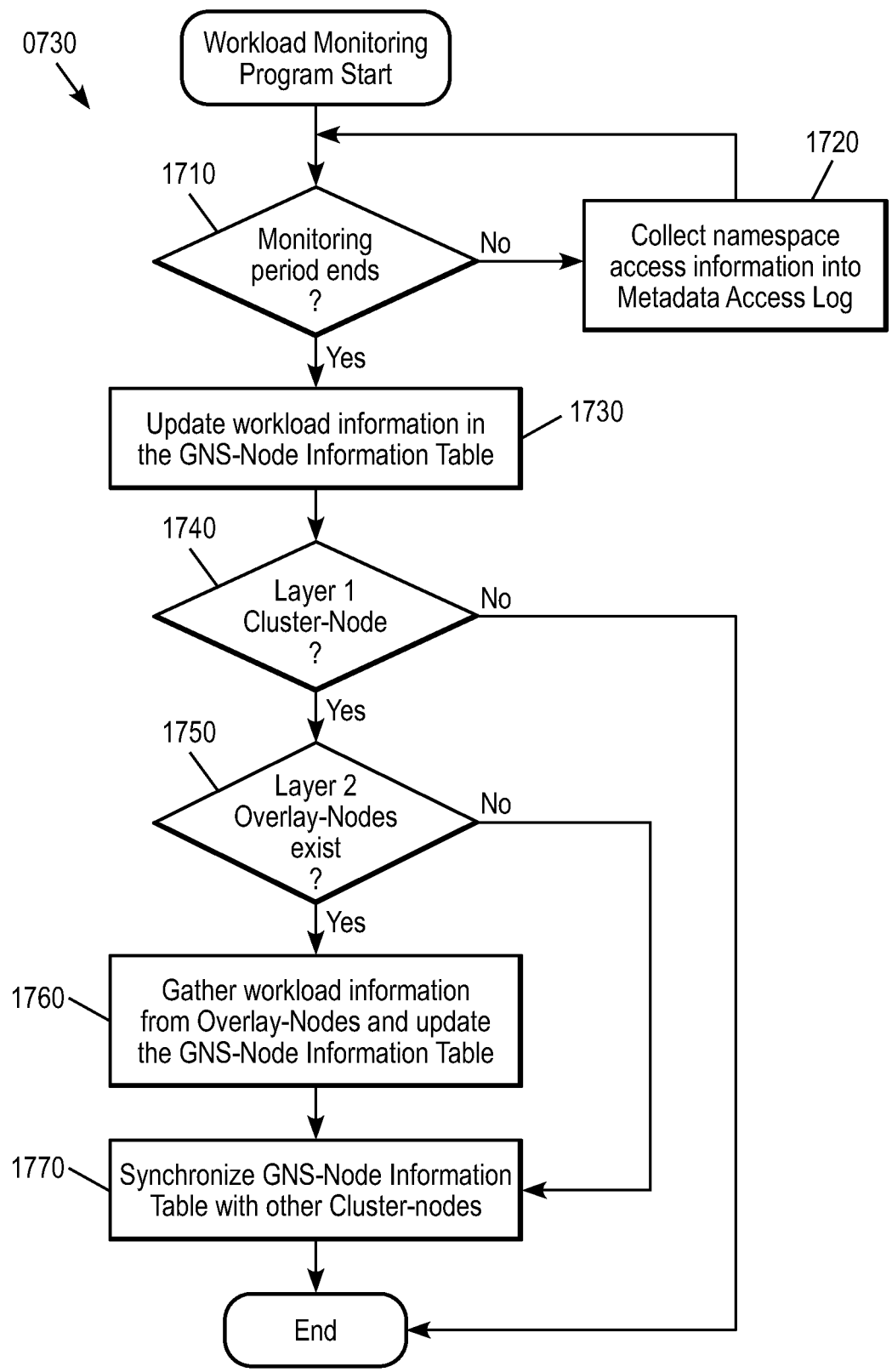
FIG. 17 is an example of a flow diagram of a workload monitoring phase.

FIG. 17 is an example of a flow diagram of the workload monitoring phase (Step 0730). The workload monitoring phase is carried out by GNS-nodes 0110 (both cluster nodes 0410 and overlay nodes 0420), by executing the workload monitoring program 0266. In Step 1710, a GNS-node 0110 checks whether the predefined monitoring time period ends. If NO, in Step 1720, the GNS-node 0110 collects namespace access information in metadata access log 0245. If YES in Step 1710, in Step 1730, the GNS-node 0110 updates the workload 0940 in the GNS-node information table 0242, based on the access information collected in the metadata access log 0245 during the monitoring time period. In Step 1740, the GNS-node 0110 checks whether it is a cluster node 0410. If YES, in Step 1750, the cluster node 0410 checks whether any overlay node 0420 exists by looking up the GNS-node information table 0242. If YES, In Step 1760, the cluster node 0410 gathers the workload information 0940 from overlay nodes 0420 and updates the GNS-node information table 0242. In Step 1770, the cluster node 0410 synchronizes the GNS-node information table 0242 with those of other cluster nodes 0410.

Figure 18:
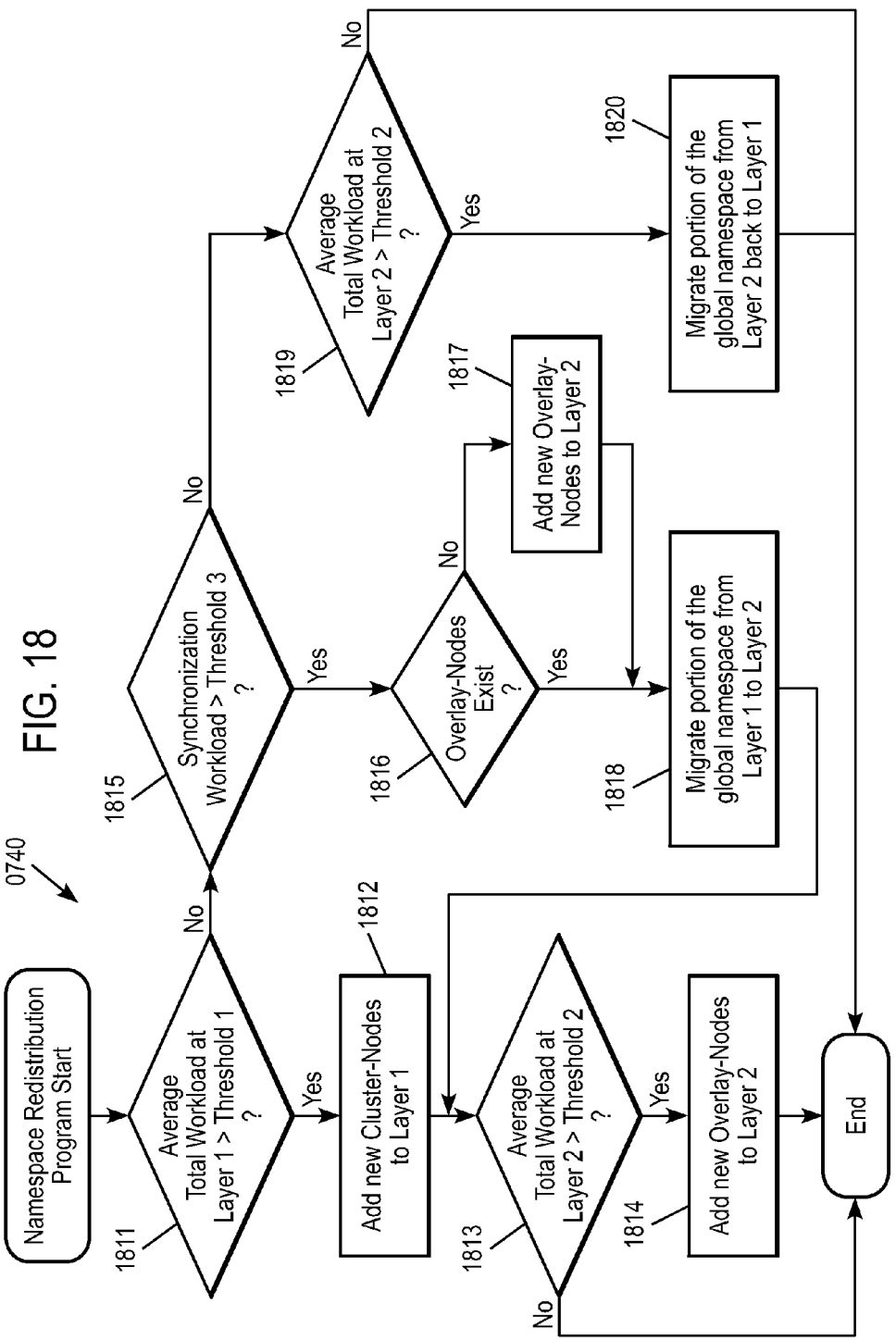
FIG. 18 is an example of a flow diagram illustrating exemplary steps of a namespace redistribution program at a cluster node.

The namespace redistribution phase is initiated by the cluster node 0410 which has the smallest node ID in the GNS-node information table 0242 (in the example in FIG. 9, the cluster node with Node ID 20), by executing the namespace redistribution program 0267. FIG. 18 is an example of a flow diagram illustrating exemplary steps of the namespace redistribution program 0267 at the cluster node 0410. In Step 1811, the cluster node 0410 checks whether the average total workload of all the cluster nodes 0410 at the cluster layer 0430 (layer 1) is greater than a predefined threshold, referred to as threshold 1, based on the workload information 0940 collected in the workload monitoring phase (Step 0730). If YES, in Step 1812, the cluster node 0410 starts the process to add one or more new cluster nodes 0410 to the cluster layer 0430.

Figure 19:
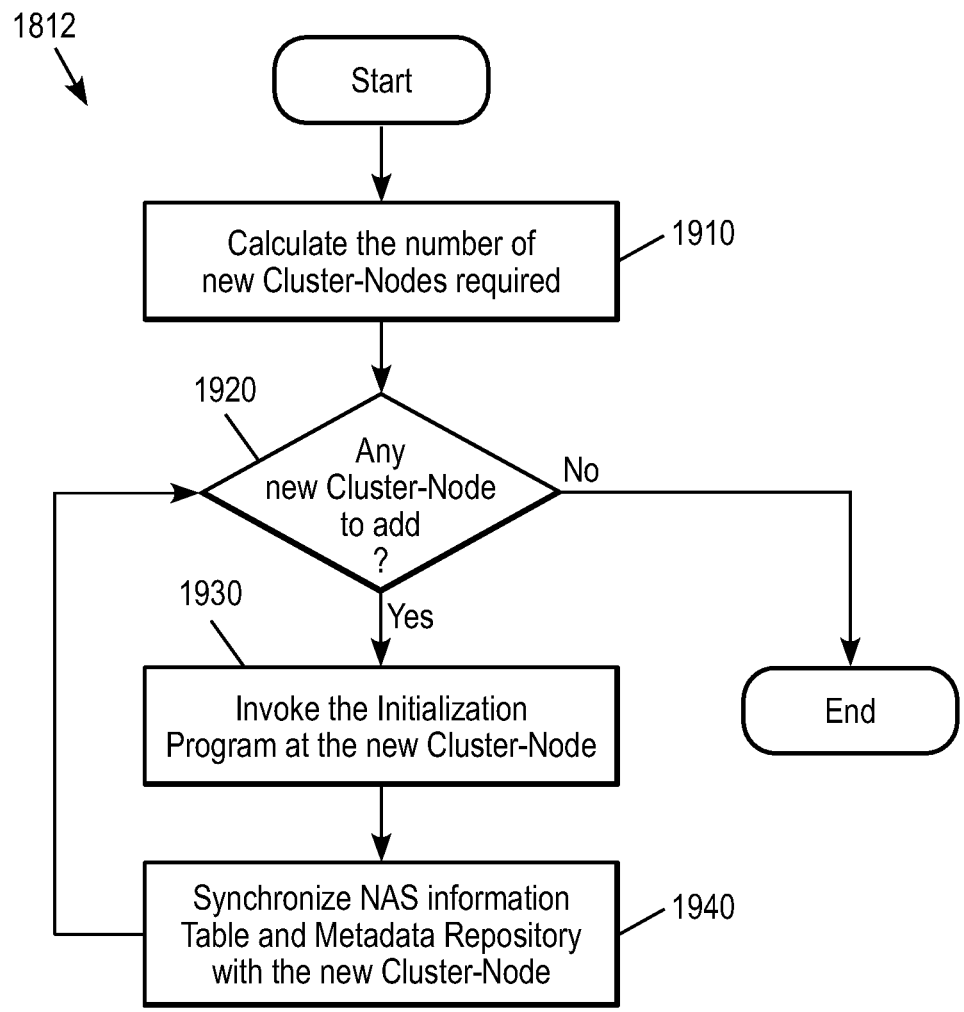
FIG. 19 is a flow diagram illustrating exemplary steps for adding new cluster nodes to the cluster layer.

FIG. 19 is a flow diagram illustrating exemplary steps constituting Step 1812. In Step 1910, the cluster node 0410 calculates the number of new cluster nodes 0410 required to share the workload, so that the average total workload at the cluster layer 0430 will be lower than threshold 1. In Step 1920, the cluster node 0410 checks whether a new cluster node 0410 needs to be added to the cluster layer 0430. If YES, in Step 1930, the cluster node 0410 invokes the initialization program 0264 at the new cluster node 0410 to join the cluster layer, as shown in FIG. 8. In Step 1940, the cluster node 0410 synchronizes the NAS information table 0243 and metadata repository 0244 in the new cluster node 0410. Steps 1920, 1930, and 1940 are repeated until all new cluster nodes 0410 are added to the cluster layer 0430.

Referring back to FIG. 18, in Step 1813, the cluster node 0410 checks whether the average total workload of all overlay nodes 0420 at the consistent hashing overlay layer 0440 (layer 2) is greater than a predefined threshold, referred to as threshold 2. If YES, in Step 1814, the cluster node 0410 starts the process to add one or more new overlay nodes to the consistent hashing overlay layer 0440.

Figure 20:
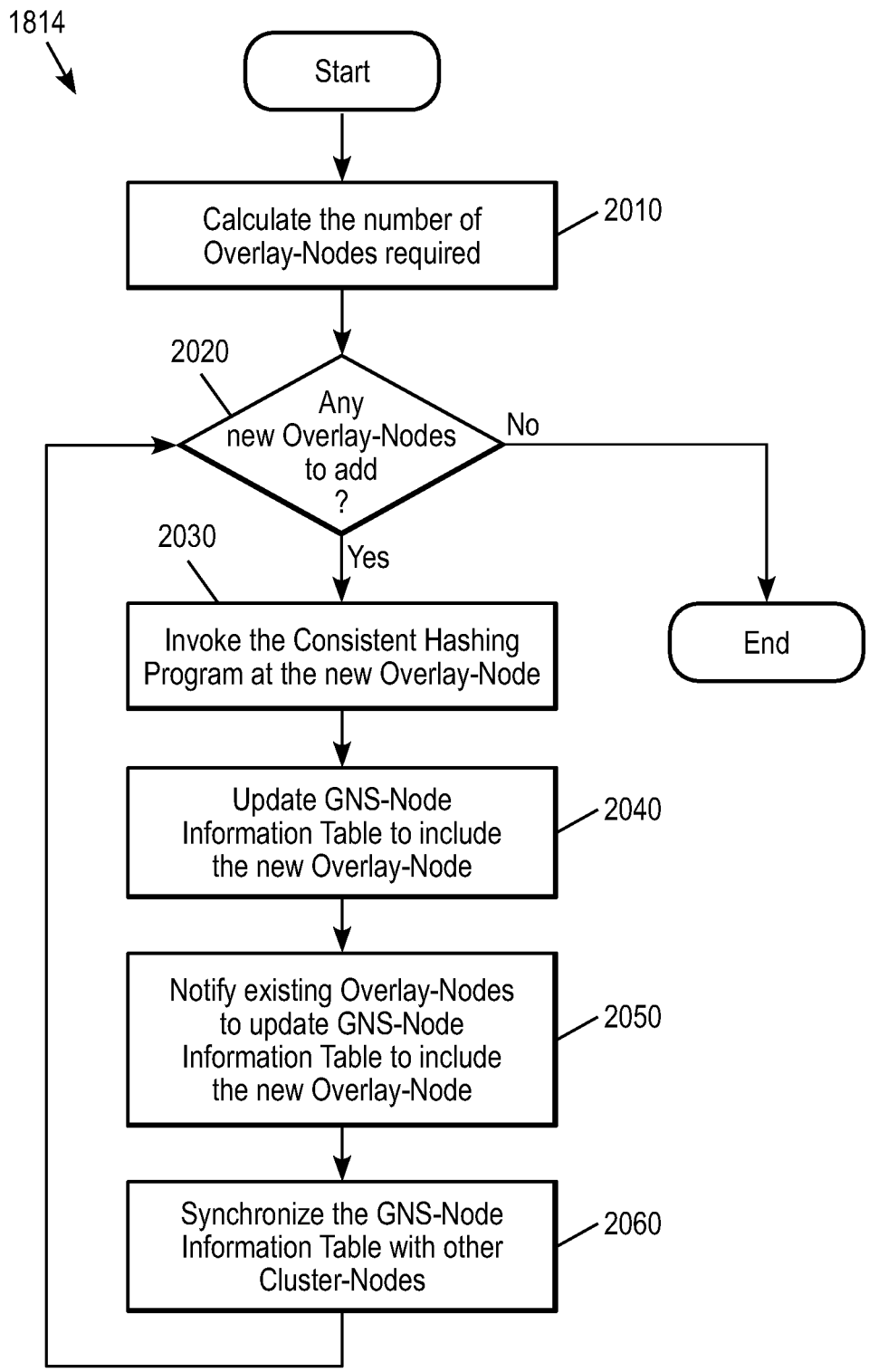
FIG. 20 is a flow diagram illustrating exemplary steps for adding new overlay nodes to the consistent hashing overlay layer.

FIG. 20 is a flow diagram illustrating exemplary steps constituting Step 1814. In Step 2010, the cluster node 0410 calculates the number of new overlay nodes 0420 required to share the workload, so that the average total workload at the consistent hashing overlay layer 0440 will be lower than threshold 2. In Step 2020, the cluster node 0410 checks whether a new overlay node 0420 needs to be added to the consistent hashing overlay layer 0440. If YES, in Step 2030, the cluster node 0410 invokes the consistent hashing program 0263 at the new overlay node 0420 to join the consistent hashing overlay layer 0440.

Figure 21:
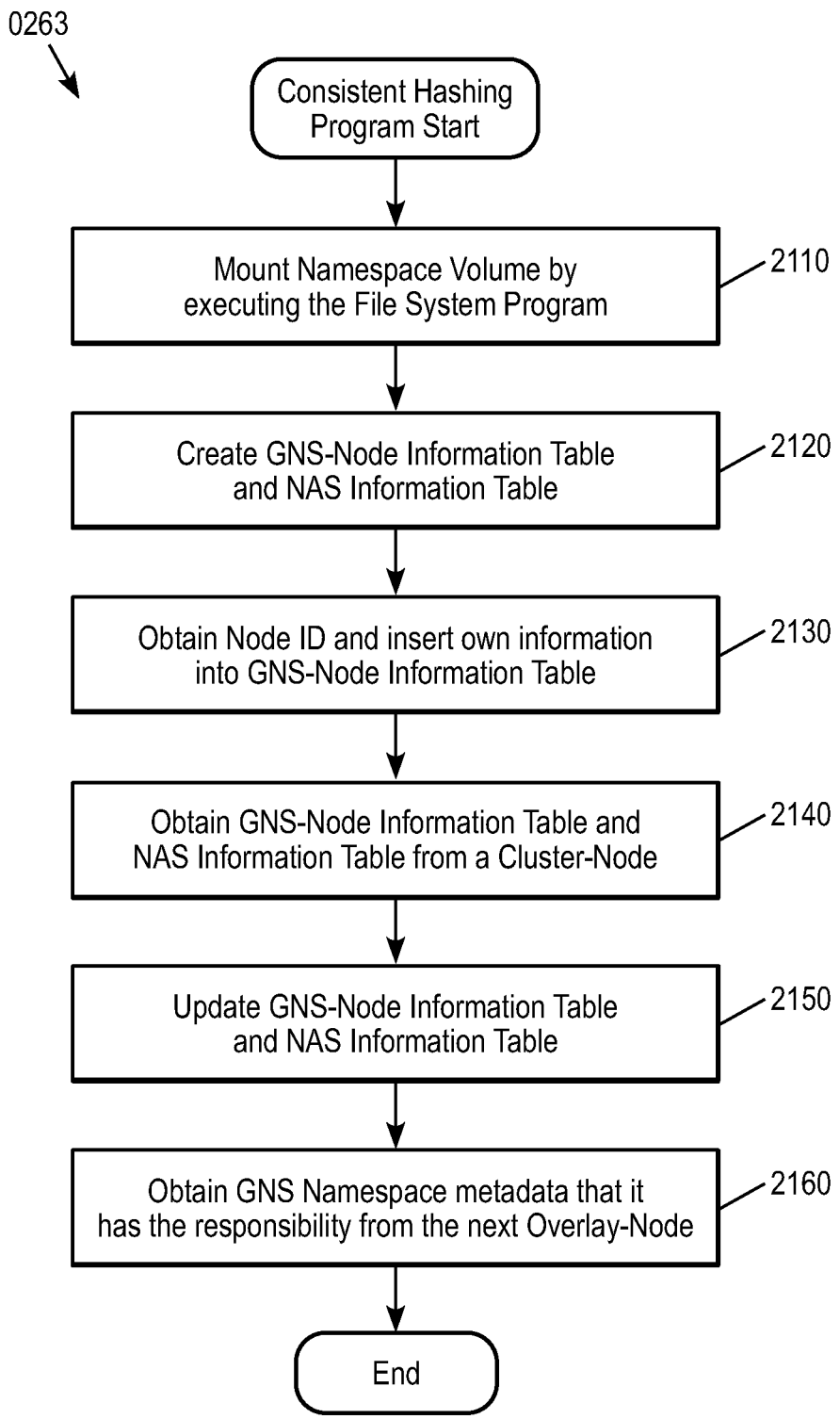
FIG. 21 is a flow diagram illustrating exemplary steps of a consistent hashing program.

FIG. 21 is a flow diagram illustrating exemplary steps of the consistent hashing program 0263. In Step 2110, the overlay node 0420 mounts the namespace volume 0241 by executing the file system program 0261, so that the global namespace information can be stored into and retrieved from the namespace volume 0241. In Step 2120, the overlay node 0420 creates the GNS-node information table 0242 and NAS information table 0243 in the namespace volume 0241. In Step 2130, the overlay node 0420 obtains its node ID 0530 by calculating the hash value of its IP address, using the hashing function implemented in the consistent hashing program 0263. The overlay node 0420 then inserts its own information, such as its node ID or layer (with value "overlay"), into the GNS-node information table 0242. In Step 2140, the overlay node 0420 obtains the GNS-node information table 0242 and NAS information table 0243 from the cluster node 0410 which invoked the consistent hashing program 0263. In Step 2150, the overlay node 0420 updates its own GNS-node information table 0242 and NAS information table 0243 based on the information obtained in Step 2140. In Step 2160, the overlay node 0420 obtains the GNS namespace metadata that it has the responsibility from the next overlay node 0420, whose node ID is numerically closest clockwise in the consistent hashing overlay layer 0440.

Referring back to FIG. 20, in Step 2040, the cluster node 0410 updates its GNS-node information table 0242 to include the new overlay node 0420. In Step 2050, the cluster node 0410 notifies other existing overlay nodes 0420 to update their GNS-node information tables 0242 to include the new overlay node 0420. In Step 2060, the cluster node 0410 synchronizes the GNS-node information table 0242 with other cluster nodes 0410.

Referring back to FIG. 18 again, if NO in Step 1811, in Step 1815, the cluster node 0410 checks whether its synchronization workload is greater than a predefined threshold, referred to as threshold 3. If YES, in Step 1816, the cluster node 0410 checks whether any overlay node 0420 exists at the consistent hashing overlay layer 0440 (layer 2). If NO, in Step 1817, the cluster node 0410 starts the process to add new overlay nodes to the consistent hashing overlay layer 0440, as shown in FIG. 20. When there is no existing overlay node 0420 at the consistent hashing overlay layer 0440, a predefined minimal number of overlay nodes 0420 may be obtained in Step 2010. In Step 1818, the cluster node 0410 starts the process to migrate a portion of the global namespace from the cluster layer 0430 (layer 1) to the consistent hashing overlay layer 0440 (layer 2).

Figure 22:
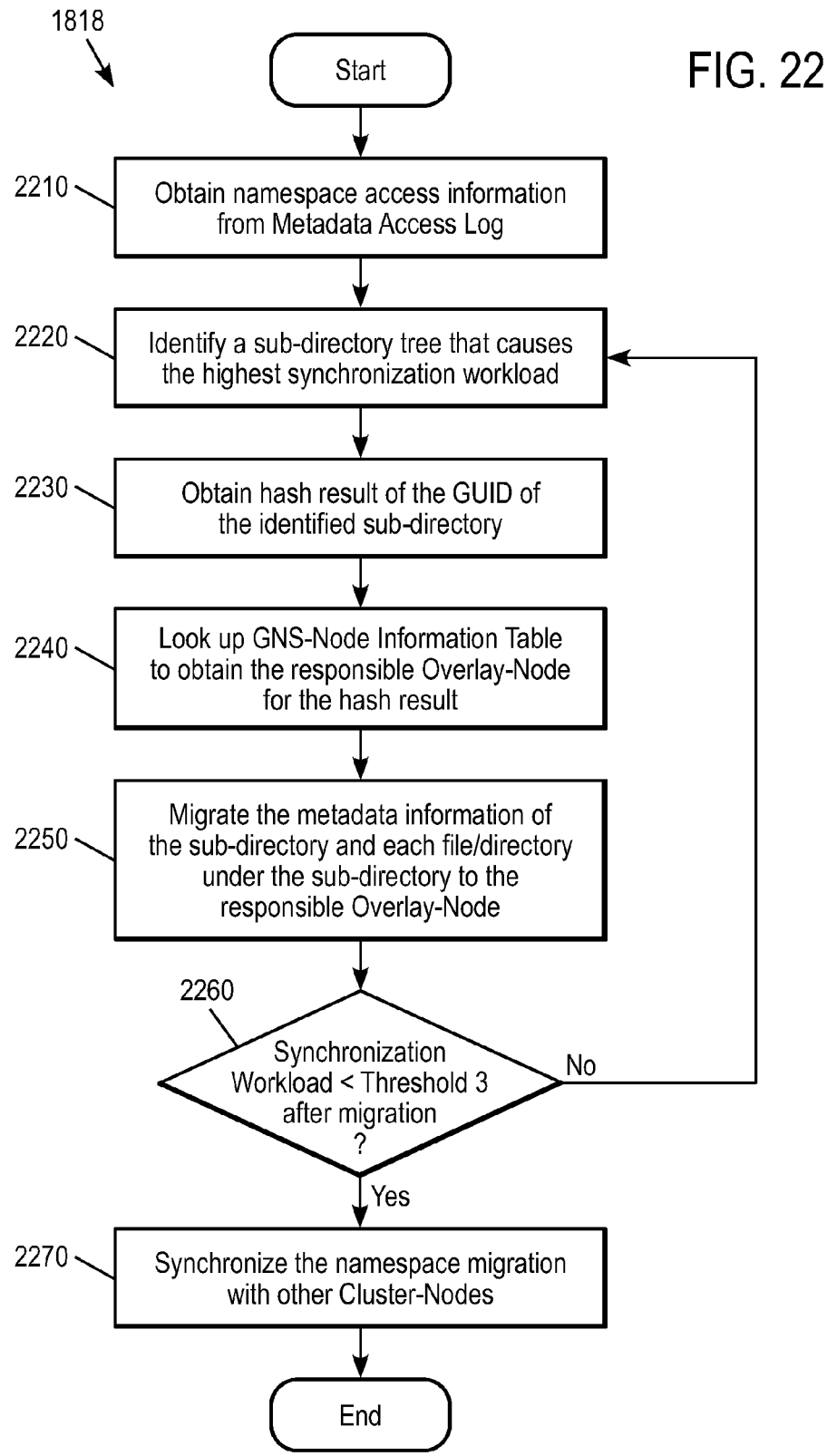
FIG. 22 is a flow diagram illustrating exemplary steps for migrating a portion of the global namespace from the cluster layer to the consistent hashing overlay layer.

FIG. 22 is a flow diagram illustrating exemplary steps constituting Step 1818. In Step 2210, the cluster node 0410 obtains namespace access information from the metadata access log 0245. In Step 2220, the cluster node 0410 identifies a sub-directory tree that causes the highest synchronization workload. In Step 2230, the cluster node 0410 obtains the hash result of the GUID of the identified sub-directory. In Step 2240, the cluster node 0410 looks up the GNS-node information table 0242 to obtain the responsible overlay node 0420 at the consistent hashing overlay layer 0440 for the hash result. In Step 2250, the cluster node 0410 migrates the metadata information of the sub-directory and each file/directory under the sub-directory to the responsible overlay node 0420.

Figure 23:
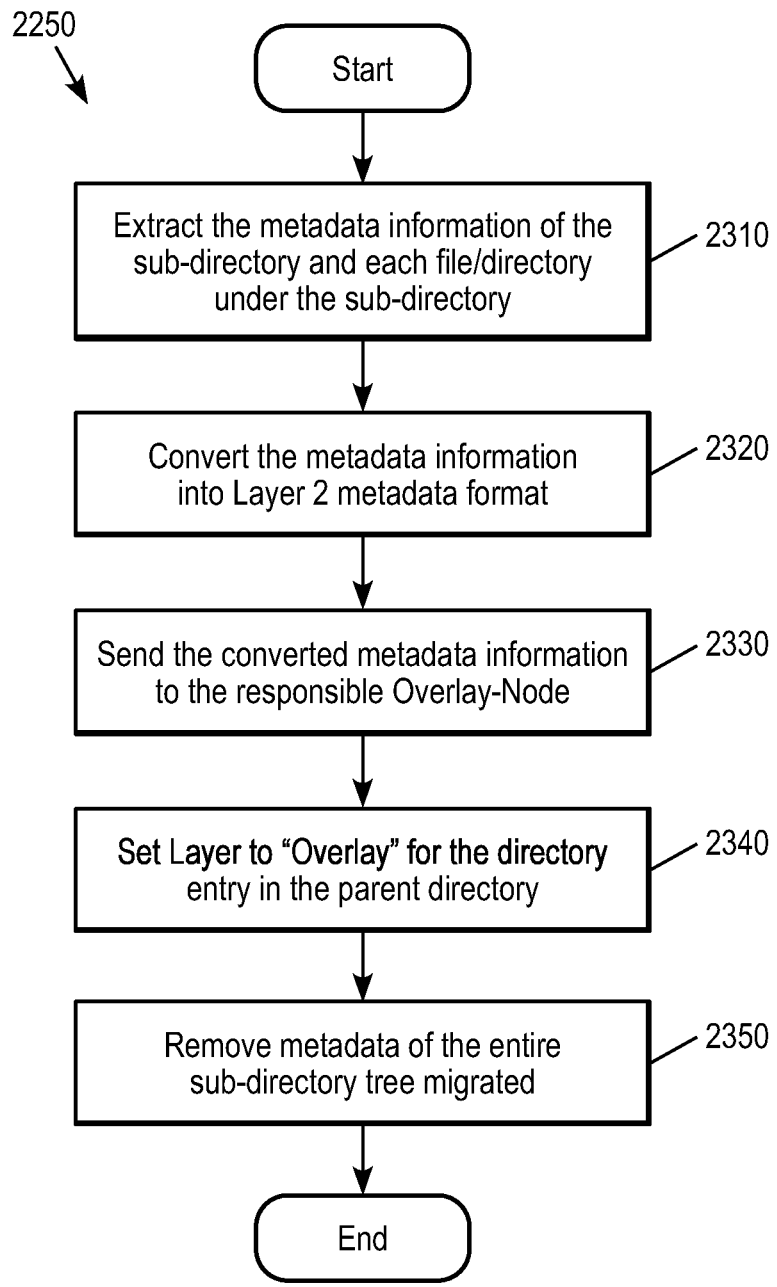
FIG. 23 is a flow diagram illustrating exemplary steps for migrating metadata information of a sub-directory and each file/directory under the sub-directory to a responsible overlay node.

FIG. 23 is a flow diagram illustrating exemplary steps constituting Step 2250. In Step 2310, the cluster node 0410 extracts the metadata information of the sub-directory and each file/directory under the sub-directory from the metadata repository 0244. In Step 2320, the cluster node 0410 converts the metadata information into the format required by an overlay node 0420 at the consistent hashing overlay layer 0440. It should be noted that a cluster node 0410 stores the metadata information in the manner of inode information in the metadata repository 0244, as shown in FIG. 15. While at the consistent hashing overlay layer 0440, an overlay node 0420 stores the metadata information in a table, indexed by the hash value.

FIG. 24 shows an example of the structure of metadata information stored in the metadata repository 0244 at an overlay node 0420. The metadata information consists of, but is not limited to, hash value 2410, GUID 2420, GNS path 2430, IP address of NAS 2440, path within NAS share 2450, type 2460, ACL 2470, and others 2480. The hash value 2410 is the hash result of the GUID of the top level directory in the migrated sub-directory tree, obtained at Step 2230. In other words, all the files/directories under the sub-directory migrated to the consistent hashing overlay layer 0440 have the same hash value. As a result, all the metadata information of a migrated sub-directory tree is stored in one overlay node

0420 at the consistent hashing overlay layer 0440. The GUID 2420 is a global unique ID assigned for the namespace entry. The GNS path 2430 is the absolute path in the GNS hierarchy. The IP address of NAS 2440 and the path within NAS share 2450 further describe the location of the corresponding file/directory within a NAS device 0120. The type 2460 is either "file" or "directory". The ACL 2470 is the access right of the file/directory. The others 2480 are used to store the directory entries of a directory, as shown in FIG. 16, and other useful information about the file/directory (for example, the created time or size).

Referring back to FIG. 23, in Step 2330, the cluster node 0410 sends the converted metadata information to the responsible overlay node 0420. In Step 2340, the cluster node 0410 sets the layer to "overlay" for the corresponding directory entry in the parent directory of the migrated sub-directory, as shown in FIG. 25, where the sub-directory tree of "/B/B2" is migrated to the consistent hashing overlay layer 0440 (compare FIG. 16).

Referring back to FIG. 23 again, in Step 2350, the cluster node 0410 removes the metadata information of the entire migrated sub-directory tree from the metadata repository 0244.

Referring back to FIG. 22, in Step 2260, the cluster node 0410 checks whether the synchronization workload is lower than threshold 3 after the metadata migration at Step 2250. If NO, the cluster node 0410 repeats from Step 2220 to identify the next sub-directory tree to migrate to the consistent hashing overlay layer 0440. If YES in Step 2260, in Step 2270, the cluster node 0410 synchronizes the namespace migration with other cluster nodes 0410.

FIG. 26 illustrates an example of GNS namespace distribution after Step 1818. As shown in the example, the global namespace is divided into two portions, portion 1 and portion 2. The global namespace of portion 1 is stored and synchronized among the cluster nodes 0410 at the cluster layer 0430 (layer 1). Portion 2 consists of two sub-directory trees, sub-tree "/A/A2" and sub-tree "/B/B2". These are the two sub-directory trees that cause most of the synchronization workload at the cluster layer, identified at Step 2220, and have been migrated to consistent hashing overlay layer 0440, stored at the overlay nodes 0420 that are responsible for the hash results of the GUID of "/A/A2" and "/B/B2", respectively.

Referring back to FIG. 18 again, after Step 1818, the cluster node 0410 checks whether the average total workload of all overlay nodes 0420 at the consistent hashing overlay layer 0440 (layer 2) is greater than threshold 2. If YES, in Step 1814, the cluster node 0410 starts the process to add new overlay nodes to the consistent hashing overlay layer 0440, as shown in FIG. 20. If NO in Step 1815, in Step 1819, the cluster node 0410 checks whether the average total workload of all the overlay nodes 0420 at the consistent hashing overlay layer 0440 (layer 2) is greater than threshold 2. If YES, in Step 1820, the cluster node 0410 starts the process to migrate a portion of the global namespace from consistent hashing overlay layer 0440 (layer 2) back to the cluster layer 0430 (layer 1).

Figure 27:
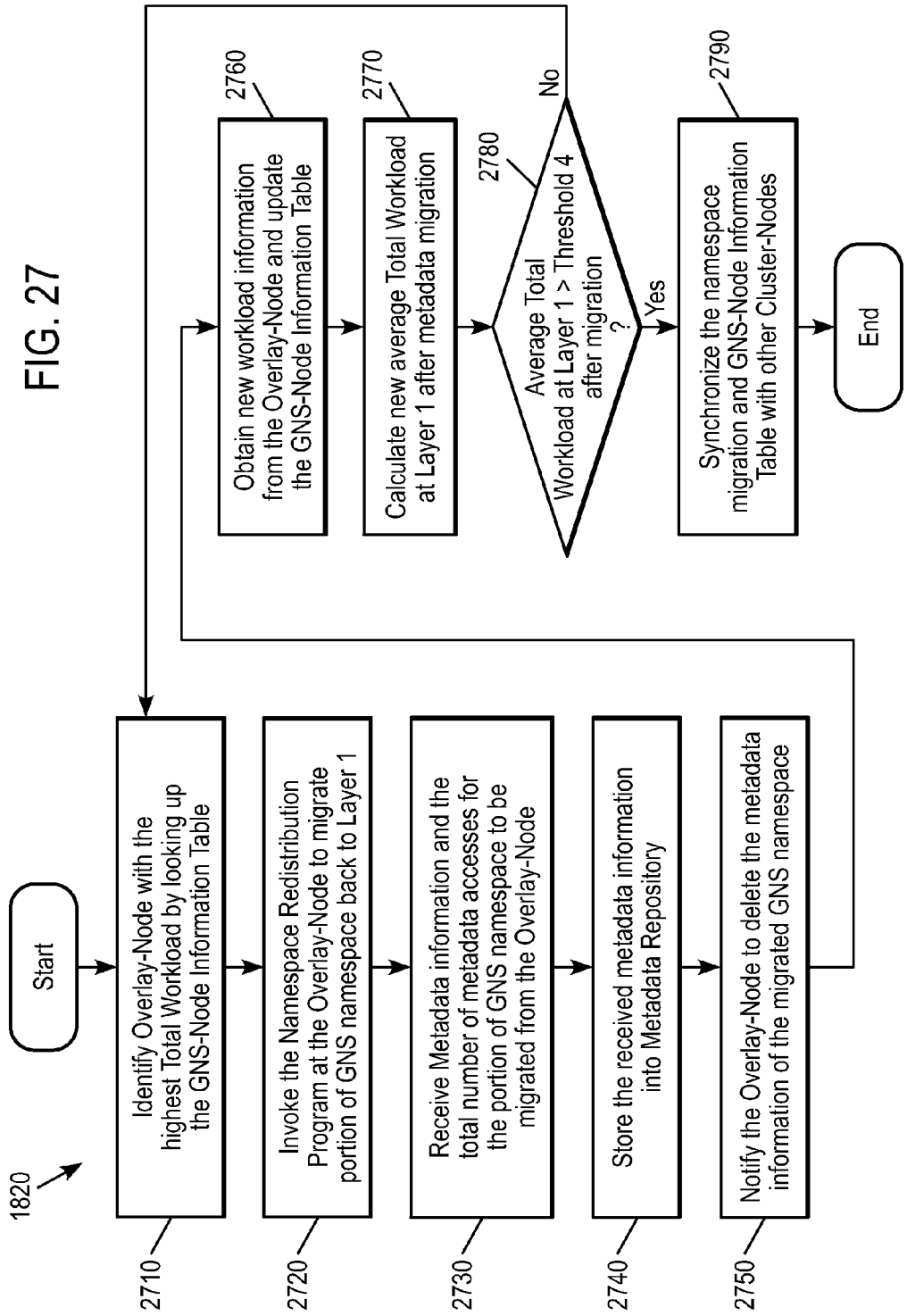
FIG. 27 is a flow diagram illustrating exemplary steps for migrating a portion of the global namespace from a consistent hashing overlay layer to a cluster layer.

FIG. 27 is a flow diagram illustrating exemplary steps constituting Step 1820. In Step 2710, the cluster node 0410 identifies the overlay node 0420 with the highest total workload by looking up GNS-node information table 0242. In Step 2720, the cluster node 0410 invokes the namespace redistribution program 0267 at the overlay node 0420 to migrate a portion of the GNS namespace back to the cluster layer 0430 (layer 1).

Figure 28:
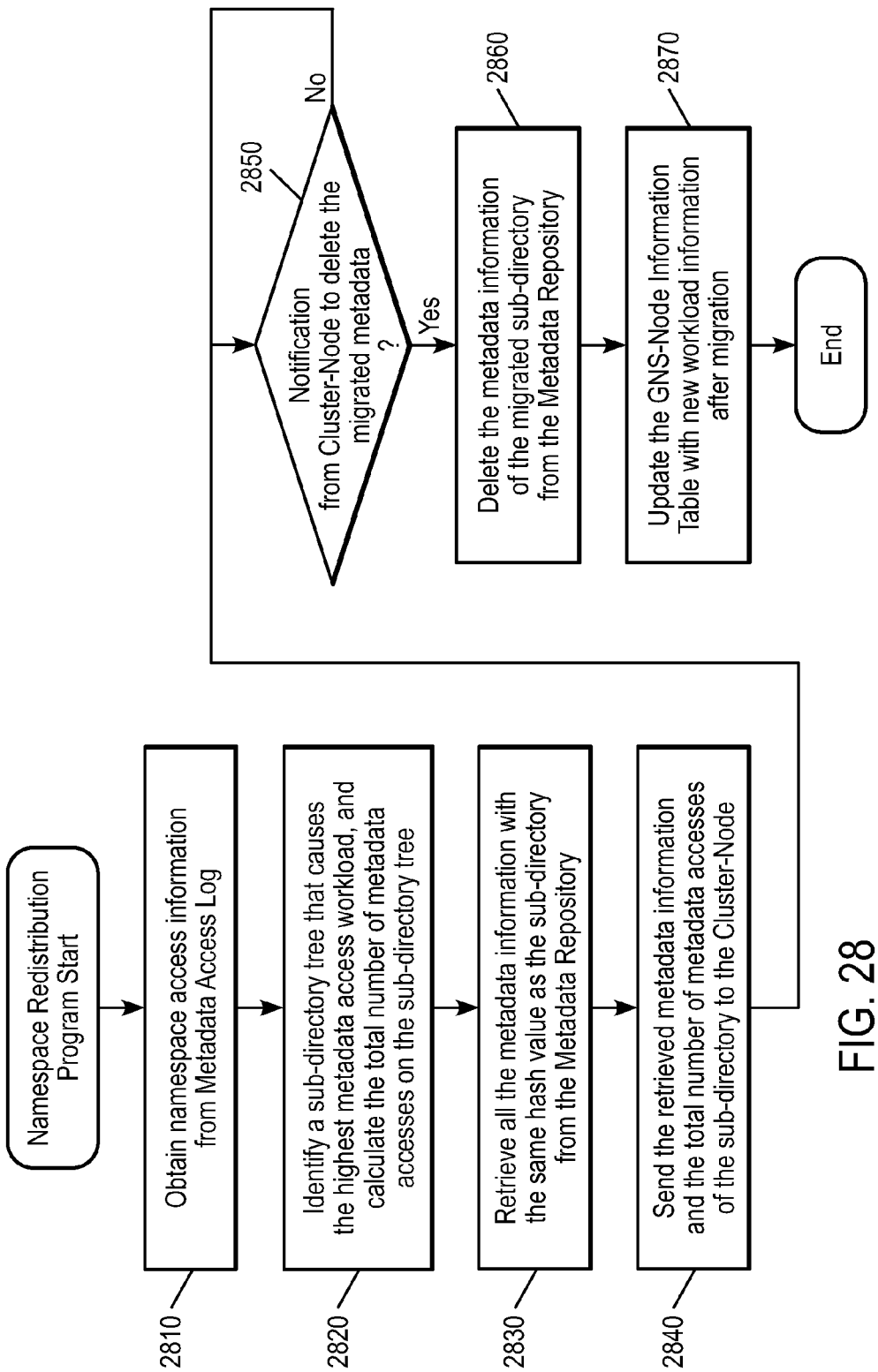
FIG. 28 is a flow diagram illustrating exemplary steps of a namespace redistribution program at an overlay node.

FIG. 28 is a flow diagram illustrating exemplary steps of the namespace redistribution program 0267 at an overlay node 0420. In Step 2810, the overlay node 0420 obtains namespace access information from the metadata access log 0245. In Step 2820, the overlay node 0420 identifies a sub-directory tree that causes the highest metadata access workload, and calculates the total number of metadata accesses on the sub-directory tree. In Step 2830, the overlay node 0420 retrieves all metadata information with the same hash value as the sub-directory from the metadata repository 0244. In Step 2840, the overlay node 0420 sends the metadata information and the total number of metadata accesses to the cluster node 0410 which invokes its namespace redistribution program 0267. In Step 2850, the overlay node 0420 waits for the notification from the cluster node 0410 to deleted the migrated metadata. If the notification is received, in Step 2860, the overlay node 0420 deletes the metadata information of the migrated sub-directory from the metadata repository 0244. In Step 2870, the overlay node 0420 updates the GNS-node information table with new workload information after migration.

Referring back to FIG. 27, in Step 2730, the cluster node 0410 receives the metadata information and the total number of metadata accesses for the portion of the GNS namespace to be migrated from the overlay node 0420. In Step 2740, the cluster node 0410 stores the received metadata information into metadata repository 0244.

Figure 29:
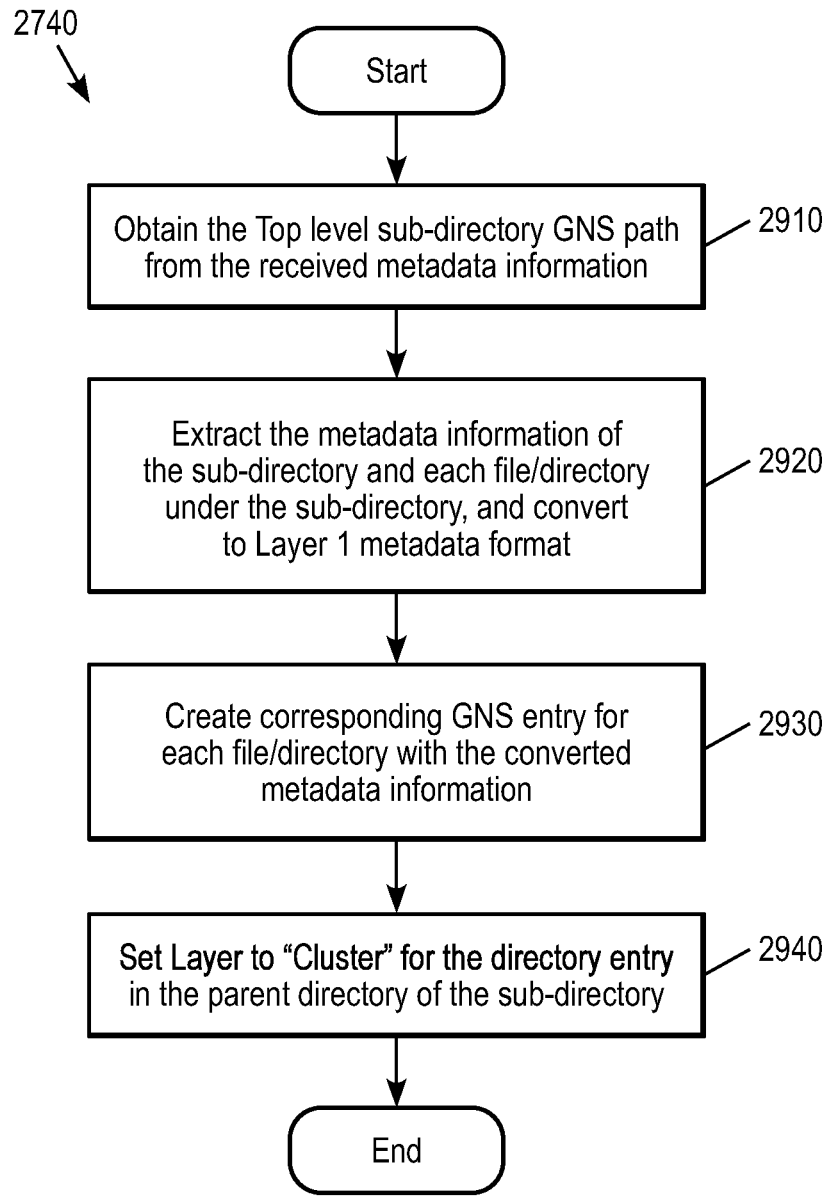
FIG. 29 is a flow diagram illustrating exemplary steps for storing metadata information into a metadata repository.

FIG. 29 is a flow diagram illustrating exemplary steps constituting Step 2740. In Step 2910, the cluster node 0410 obtains the top level sub-directory GNS path from the received metadata information. In Step 2920, the cluster node 0410 extracts the metadata information of the sub-directory and each file/directory under the sub-directory, and converts the metadata information to the cluster layer (layer 1) metadata format, as shown in FIG. 15. In Step 2930, the cluster node 0410 creates corresponding GNS entry for each file/directory with the converted metadata information in the metadata repository 0244. In Step 2940, the cluster node 0410 sets the layer to "cluster" for the corresponding directory entry in the parent directory of the migrated sub-directory.

Referring back to FIG. 27 again, in Step 2750, the cluster node 0410 notifies the overlay node 0420 to delete the metadata information of the migrated GNS namespace. In Step 2760, the cluster node 0410 obtains new workload information from the overlay node 0420 and updates its own GNS-node information table 0242. In Step 2770, the cluster node 0410 calculates the new average total workload of all the cluster nodes 0410 after the metadata migration. In Step 2780, the cluster node 0410 checks whether the new average total workload of all cluster nodes 0410 is greater than a predefined threshold, referred to as threshold 4. If NO, the cluster node 0410 repeats the steps from Step 2710 to migrate more GNS namespace back to the cluster layer 0430. If YES in Step 2780, in Step 2790, the cluster node 0410 synchronizes the namespace migration and GNS-node information table 0242 with other cluster nodes 0410.

Referring back to FIG. 7, the cluster nodes 0410 and overlay nodes 0420 repeatedly monitor the workload information (Step 0730), and dynamically adjust the portion of the GNS namespace to be managed by each layer and the number of GNS-nodes required for each layer (Step 0740), based on the workload information.

Once the GNS namespace is constructed and distributed as described above, the GNS-nodes 0110 cooperatively service the user's GNS requests, first submitted to cluster nodes 0410, by executing the request processing program 0268.

Figure 30:
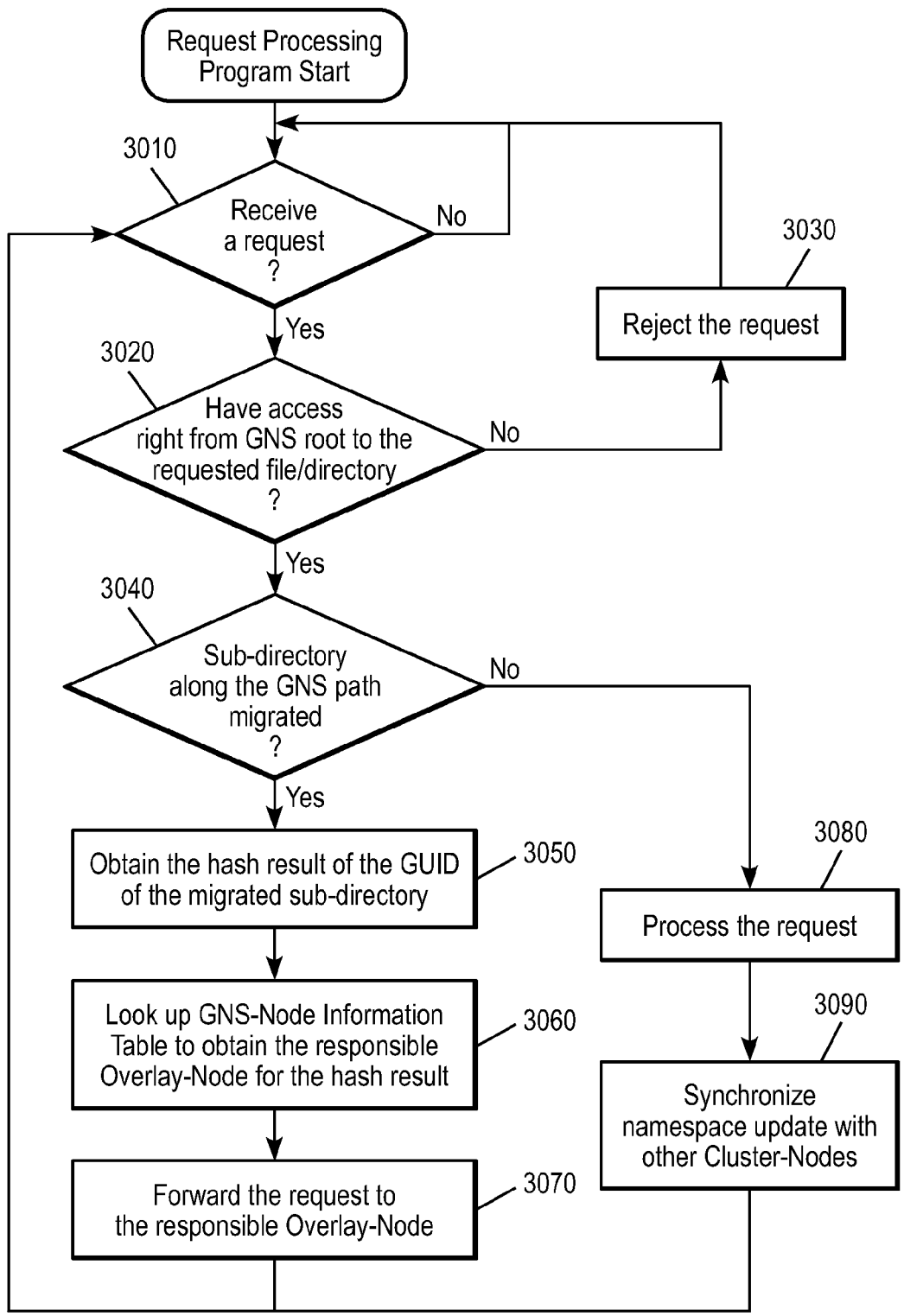
FIG. 30 is a flow diagram illustrating exemplary steps of a request processing program performed at a cluster node.

FIG. 30 is a flow diagram illustrating exemplary steps of the request processing program 0268 at a cluster node 0410. In Step 3010, the cluster node 0410 checks whether a GNS request has been received. If YES, in Step 3020, the cluster node 0410 checks whether the user has access rights from the GNS root directory to the requested file/directory. If NO, in Step 3030, the cluster node 0410 rejects the GNS request, and repeats Step 3010 to service other GNS requests. If YES in Step 3020, in Step 3040, the cluster node 0410 checks whether a sub-directory along the GNS path has been migrated to the consistent hashing overlay layer 0440. If YES, in Step 3050, the cluster node 0410 obtains the hash result of the GUID of the migrated sub-directory. In Step 3060, the cluster node 0410 looks up the GNS-node information table 0242 to obtain the responsible overlay node 0420 for the hash result. In Step 3070, the cluster node 0410 forwards the request to the responsible overlay node 0420, and repeats Step 3010 to serve other GNS requests. If NO in Step 3040, in Step 3080, the cluster node 0410 processes the request, which will be further explained in FIG. 32. In Step 3090, the cluster node 0410 synchronizes the namespace update caused by the request with other cluster nodes 0410, and repeats Step 3010 to service other GNS requests.

Figure 31:
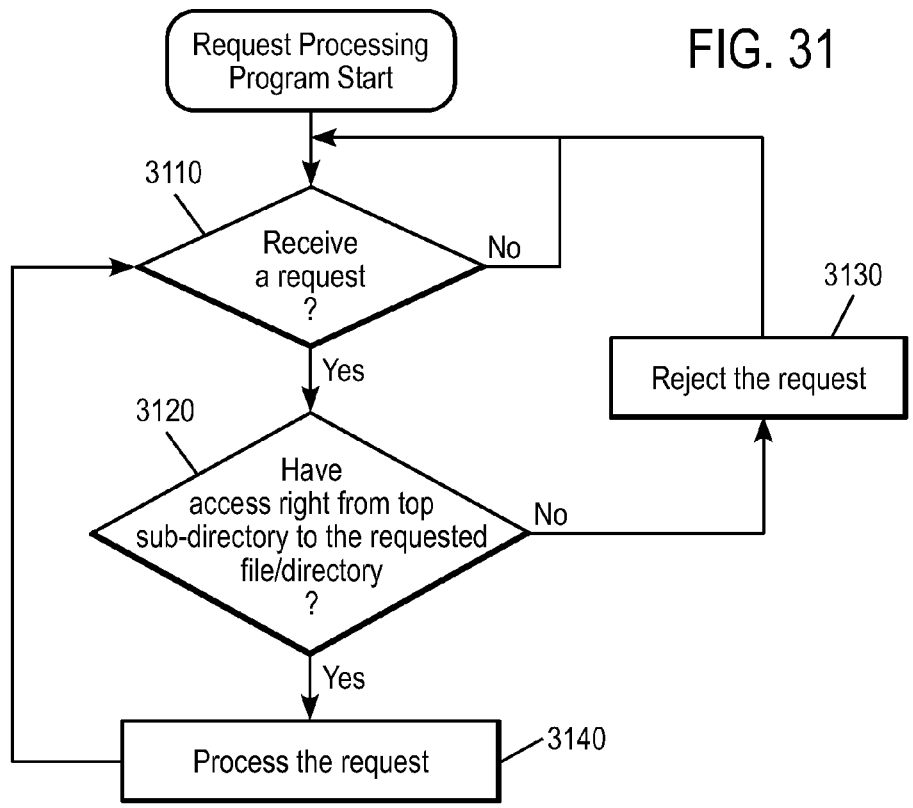
FIG. 31 is a flow diagram illustrating exemplary steps of a request processing program performed at an overlay node.

FIG. 31 is a flow diagram illustrating exemplary steps of the request processing program 0268 at an overlay node 0420. In Step 3110, the overlay node 0420 checks whether any GNS request has been received. If YES, in Step 3120, the overlay node 0420 checks whether the user has access right from the top sub-directory migrated to the requested file/directory. If NO, in Step 3130, the overlay node 0420 rejects the GNS request, and repeats Step 3110 to serve other GNS requests. If YES in Step 3120, in Step 3140, the overlay node 0420 processes the request, and repeats Step 3110 to service other GNS requests.

Figure 32:
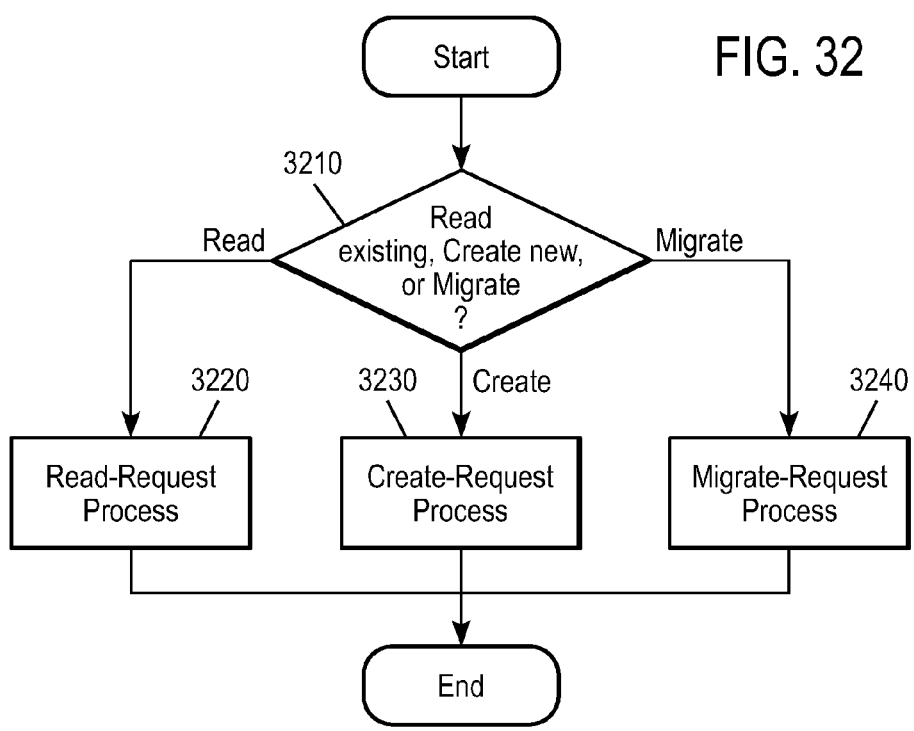
FIG. 32 is an example of a flow diagram further illustrating steps for processing a GNS request.

FIG. 32 is an example of a flow diagram further illustrating Step 3080 and Step 3140 to process a GNS request. In Step 3210, a GNS-node 0110 (either a cluster node 0410 or an overlay node 0420) checks whether the request is to read an existing GNS namespace, to create a new GNS path entry, or to migrate a file/directory from one NAS device 0120 to another. If it is a read request, in Step 3220, the read-request process is invoked. If it is a create request, in Step 3230, the create-request process is invoked. If it is a migrate request, in Step 3240, the migrate-request process is invoked.

Figure 33:
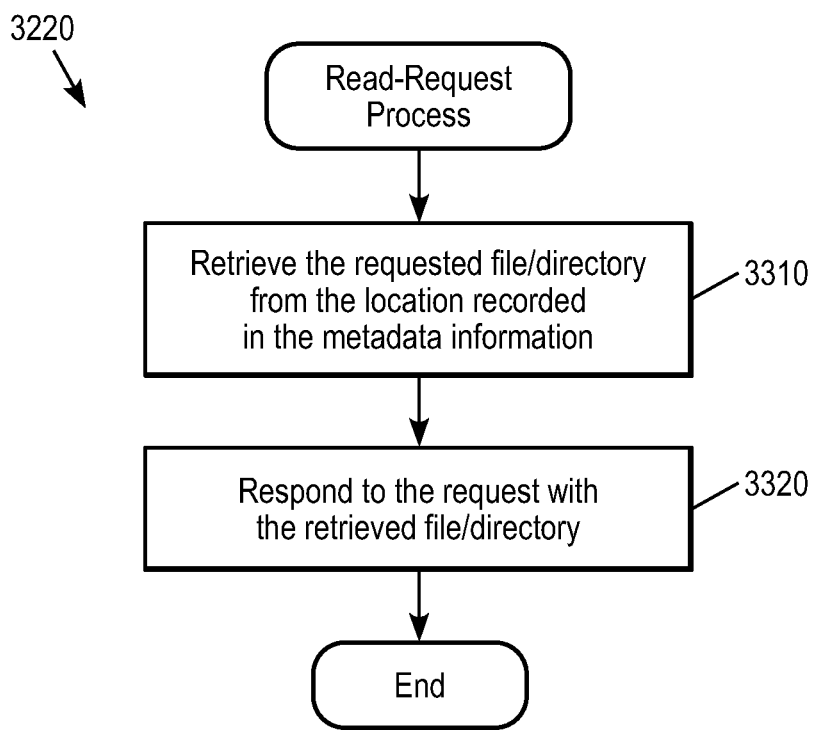
FIG. 33 is a flow diagram illustrating a read request process.

FIG. 33 is a flow diagram illustrating the read-request process (Step 3220). In Step 3310, the GNS-node 0110 retrieves the requested file/directory from the location recorded in the metadata information. In Step 3320, the GNS-node 0110 responds to the request with the retrieved file/directory.

Figure 34:
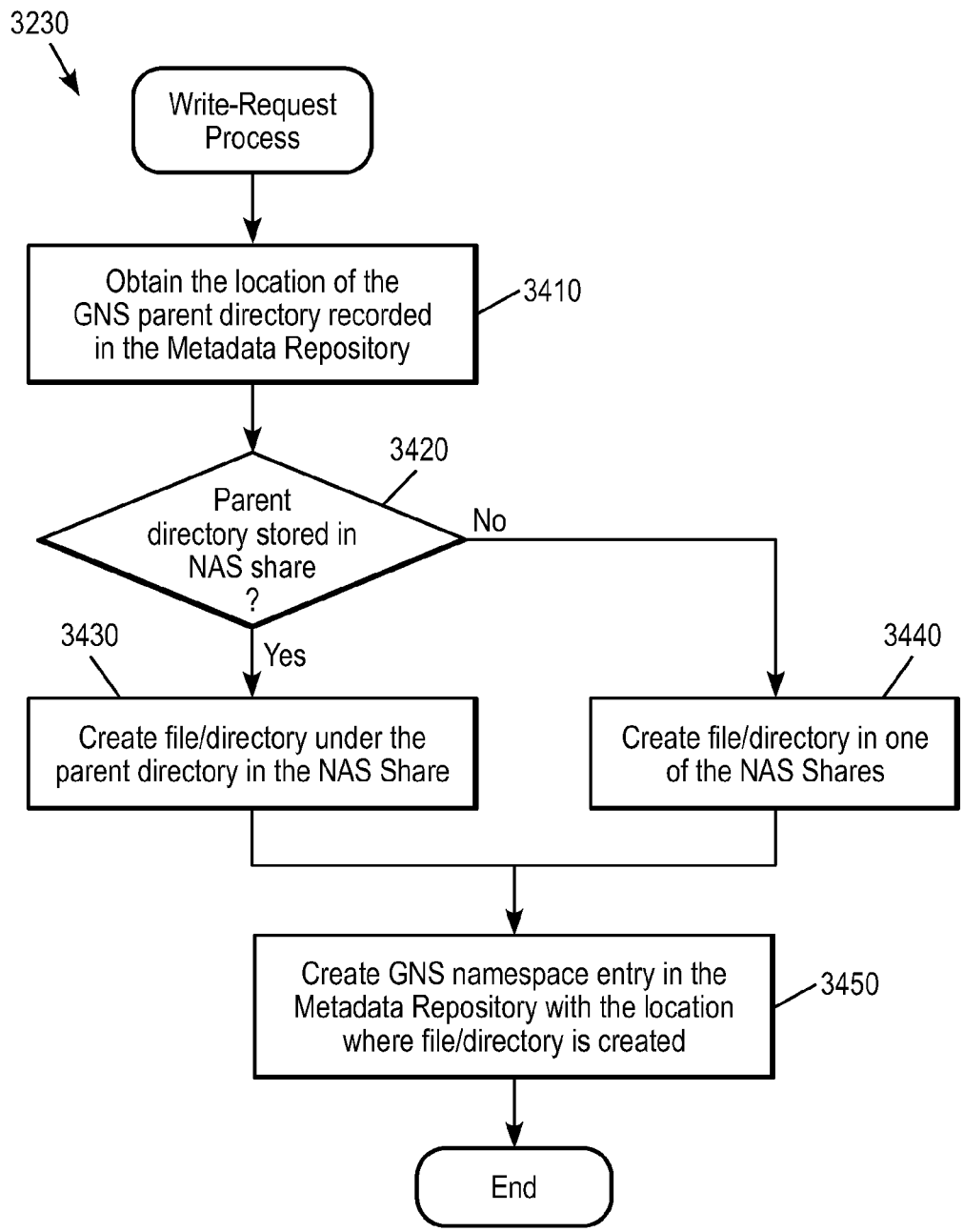
FIG. 34 is a flow diagram illustrating a create-request process.

FIG. 34 is a flow diagram illustrating the create-request process (Step 3230). In Step 3410, the GNS-node 0110 obtains the location of the GNS parent directory recorded in the Metadata Repository 0244. In Step 3420, the GNS-node 0110 checks whether the parent directory is stored in a NAS share. If YES, in Step 3430, the GNS-node 0110 creates the file/directory under the parent directory in the NAS Share. If NO in Step 3420, in Step 3440, the GNS-node 0110 creates the file/directory in any NAS Share found in the NAS Information Table 0243. In Step 3450, the GNS-node 0110 creates a GNS namespace entry in the metadata repository with the location where the file/directory is created.

Figure 35:
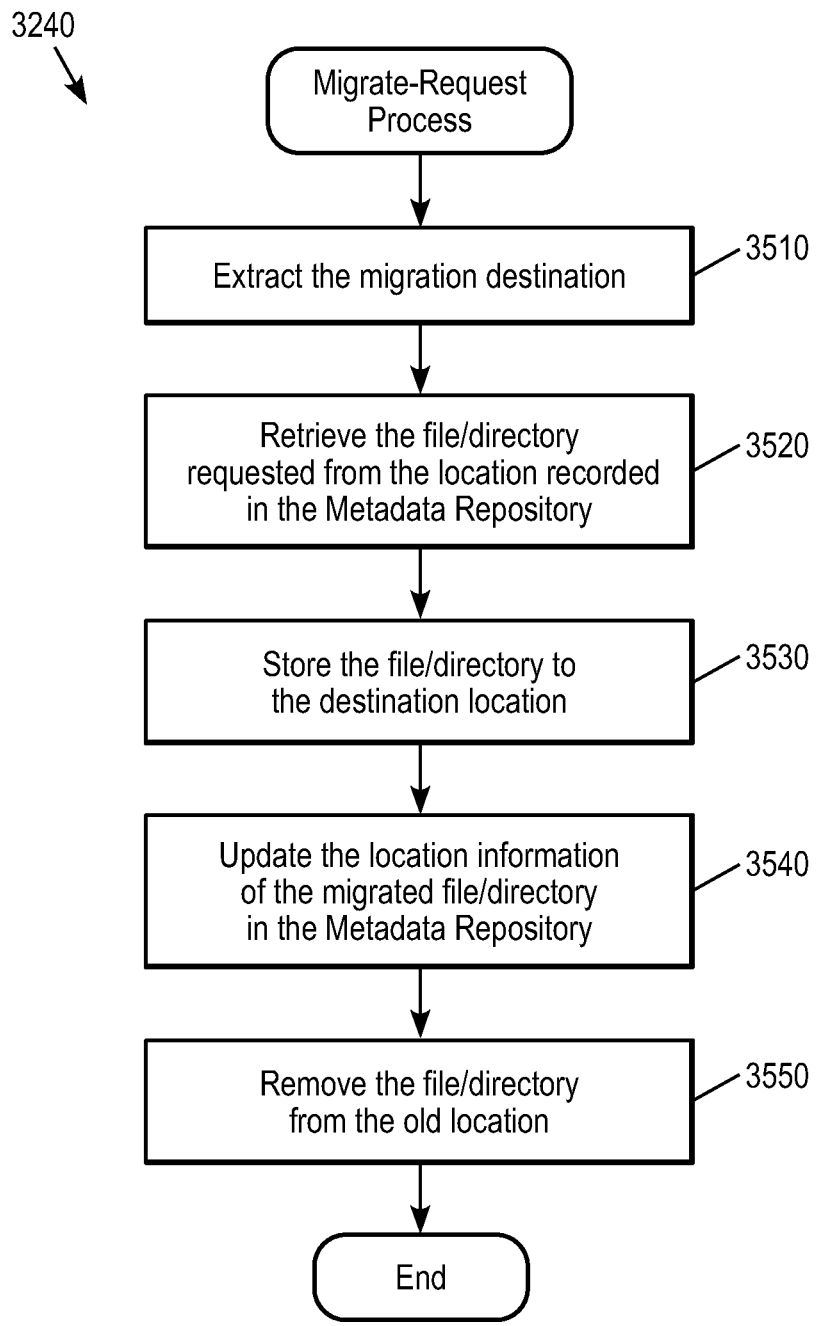
FIG. 35 is a flow diagram illustrating a migrate-request process.

FIG. 35 is a flow diagram illustrating the migrate-request process (Step 3240). In Step 3510, the GNS-node 0110 extracts the migration destination for the request. In Step 3520, the GNS-node 0110 retrieves the file/directory requested from the location recorded in the metadata repository 0244. In Step 3530, the GNS-node 0110 stores the file/directory to the destination location. In Step 3540, the GNS-node 0110 updates the location information of the migrated file/directory in the metadata repository 0244. In Step 3550, the GNS-node 0110 removes the file/directory from the old location.

During the namespace redistribution phase (Step 0740) described above, when the synchronization workload is greater than threshold 3, the cluster node 0410 (with the smallest node ID) migrates the portion of the GNS namespace that causes the highest synchronization workload to the consistent hashing overlay layer 0440 (Step 1818). However, users may also frequently access this portion of the GNS namespace and experience low request response times, as requests to access this portion of the GNS namespace have to be forwarded from the cluster layer 0430 to the consistent hashing overlay layer 0440. Further, all metadata migration and synchronization processes are carried out at the same time frame, right after the workload monitoring phase (Step 0730). This may cause a sudden network traffic burst to the cluster layer 0430.

Figure 36:
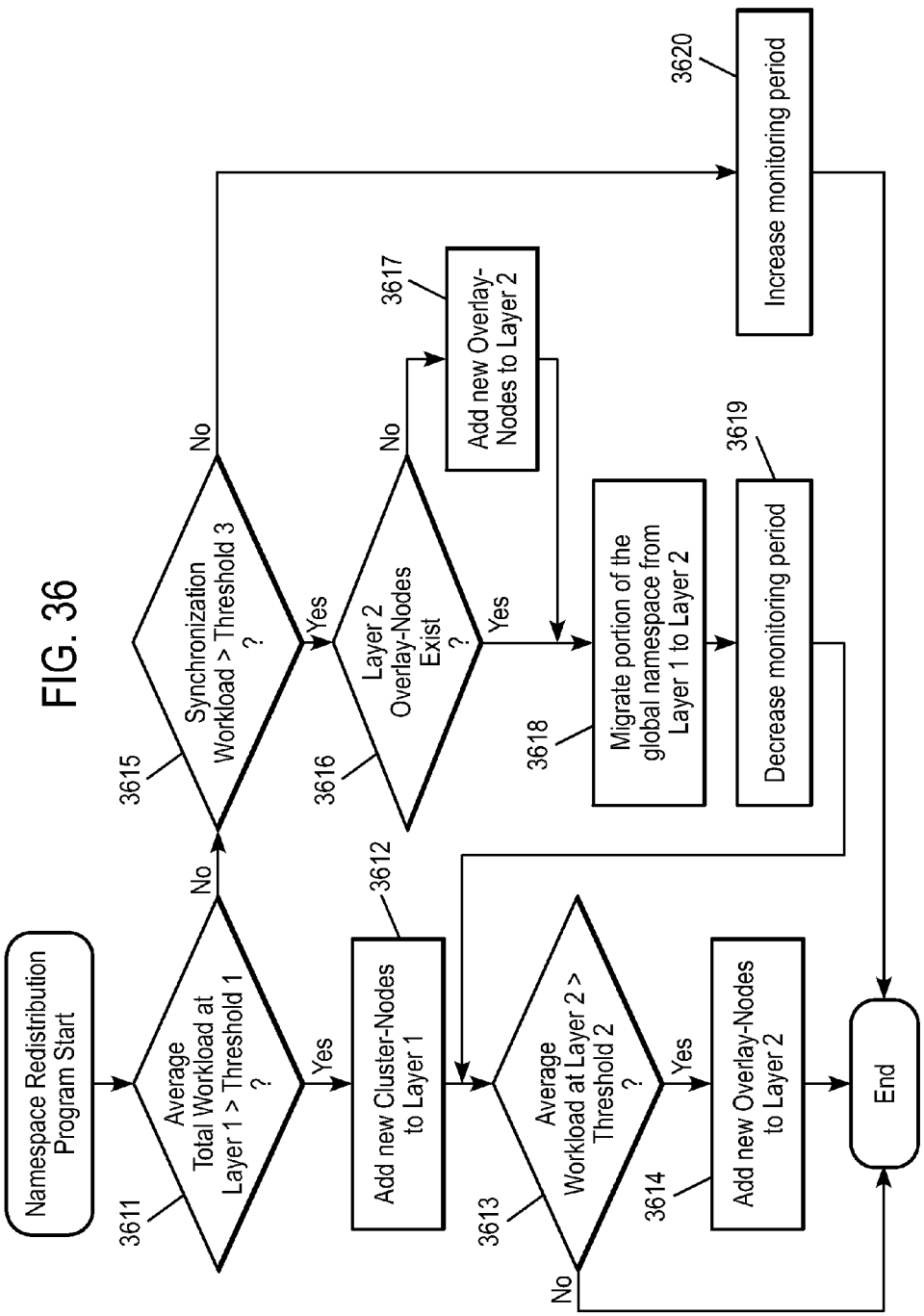
FIG. 36 is a flow diagram illustrating exemplary steps of a namespace redistribution program performed at a cluster node.

Therefore, according to a modified embodiment described below, in the workload monitoring phase (Step 0730), cluster nodes 0410 and overlay nodes 0420 monitor their workload with a different monitoring period (Step 1710). In the namespace redistribution phase (Step 0740), the cluster node 0410 (with the smallest node ID) and each overlay node separately migrate the metadata based on the access frequency, to stagger the metadata migration and synchronization processes. The explanation will mainly focus on the differences from the above description FIG. 36 is a flow diagram illustrating exemplary steps of the namespace redistribution program 0263 at a cluster node 0410 according to this embodiment. In Step 3611, the cluster node 0410 checks whether the average total workload of all cluster nodes 0410 at the cluster layer 0430 (layer 1) is greater than threshold 1, based on the workload information 0940 collected in the workload monitoring phase (Step 0730). If YES, in Step 3612, the cluster node 0410 starts the process to add new cluster nodes to the cluster layer 0430, as shown in FIG. 19. In Step 3613, the cluster node 0410 checks whether the average total workload of all overlay nodes 0420 at the consistent hashing overlay layer 0440 (layer 2) is greater than threshold 2. If YES, in Step 3614, the cluster node 0410 starts the process to add new overlay nodes to the consistent hashing overlay layer 0440, as shown in FIG. 20. If NO in Step 3611, in Step 3615, the cluster node 0410 checks whether its synchronization workload is greater than threshold 3. If YES, in Step 3616, the cluster node 0410 checks whether any overlay node 0420 exists at the consistent hashing overlay layer 0440 (layer 2). If NO, in Step 3617, the cluster node 0410 starts the process to add new overlay nodes to the consistent hashing overlay layer 0440, as shown in FIG. 20. In Step 3618, the cluster node 0410 starts the process to migrate a portion of the global namespace from the cluster layer 0430 (layer 1) to the consistent hashing overlay layer 0440 (layer 2).

Figure 37:
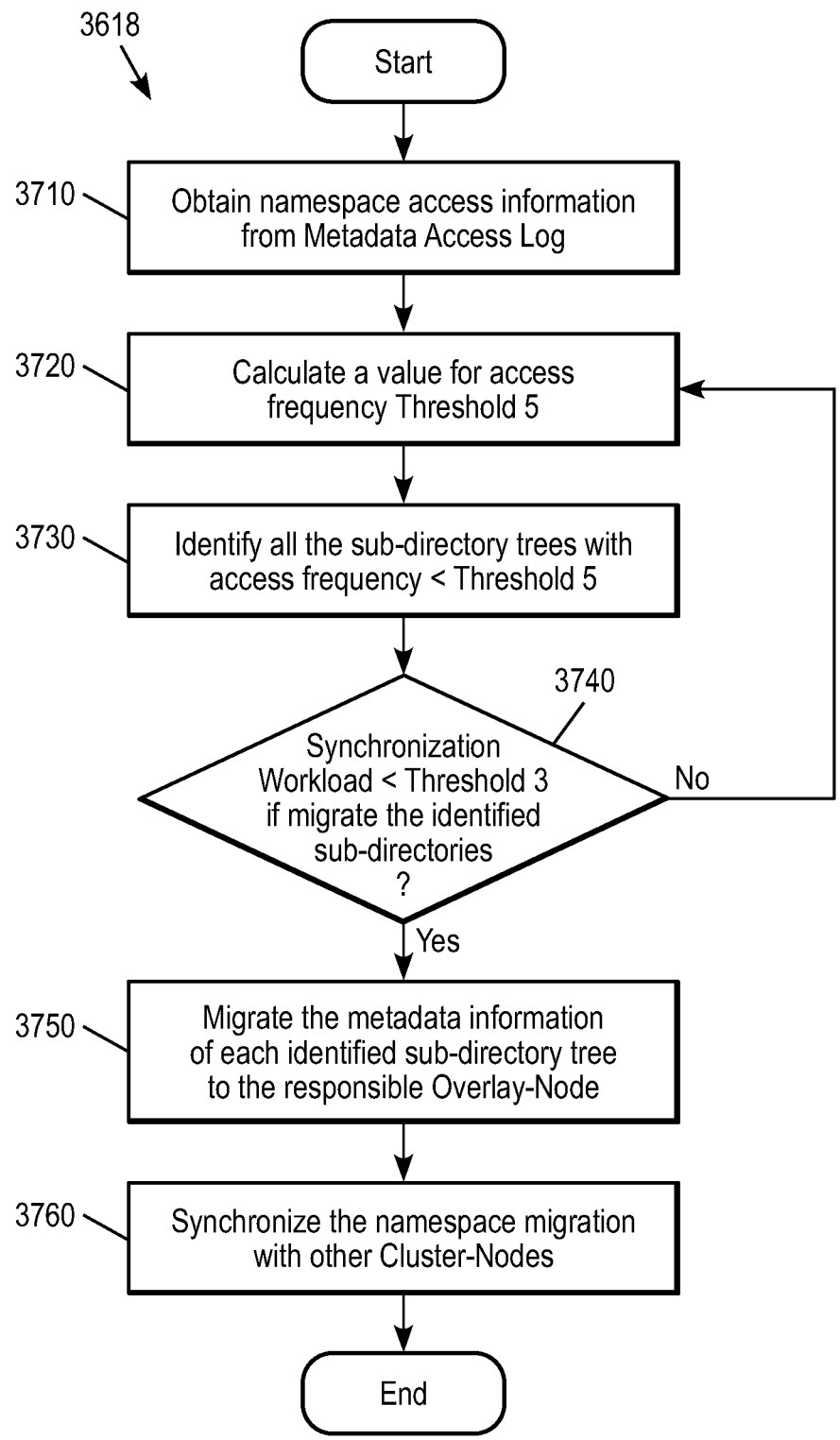
FIG. 37 is a flow diagram illustrating exemplary steps for migrating a portion of the global namespace from a cluster layer to a consistent hashing overlay layer.

FIG. 37 is a flow diagram illustrating exemplary steps constituting the Step 3618. In Step 3710, the cluster node 0410 obtains the namespace access information from the metadata access log 0245. In Step 3720, the cluster node 0410 calculates a value for a metadata access frequency threshold, referred to as threshold 5. In Step 3730, the cluster node 0410 identifies all the sub-directory trees with an access frequency lower than threshold 5. In Step 3740, the cluster node 0410 checks whether the synchronization workload will be lower than threshold 3 if the namespace of the identified sub-directories is migrated to the consistent hashing overlay layer 0440. If NO, the cluster node 0410 repeats the Step 3720. If YES in Step 3740, in Step 3750, the cluster node 0410 migrates the metadata information of each identified sub-directory tree to the responsible overlay node 0420 at the consistent hashing overlay layer 0440.

Figure 38:
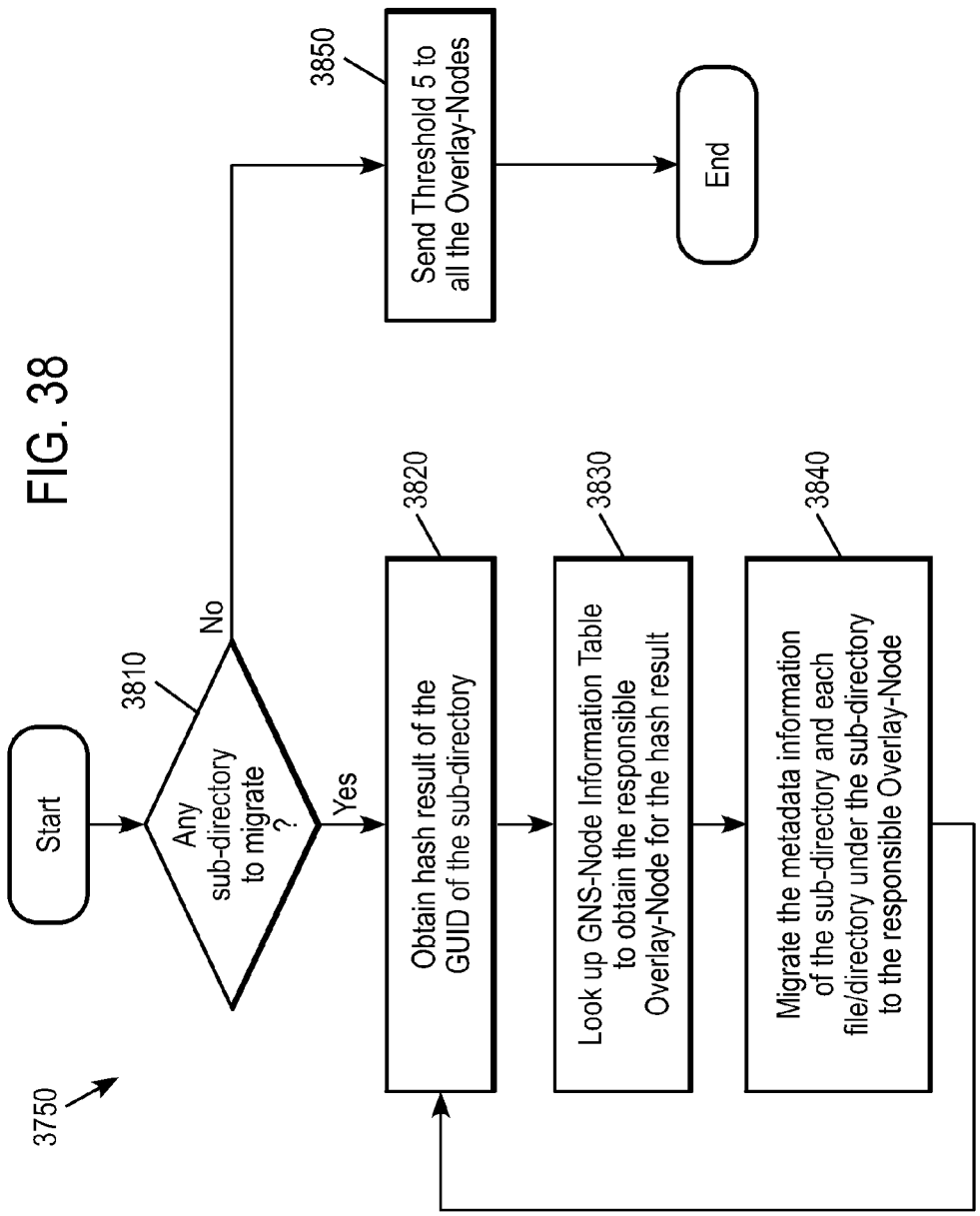
FIG. 38 is a flow diagram illustrating exemplary steps for migrating metadata information of a sub-directory tree to a responsible overlay node.

FIG. 38 is a flow diagram illustrating exemplary steps constituting the Step 3750. In Step 3810, the cluster node 0410 checks whether there are any more sub-directories to migrate. If YES, in Step 3820, the cluster node 0410 obtains the hash result of the GUID of the sub-directory. In Step 3830, the cluster node 0410 looks up the GNS-node information table 0242 to obtain the responsible overlay node 0420 for the hash result. In Step 3840, the cluster node 0410 migrates the metadata information of the sub-directory and each file/directory under the sub-directory to the responsible overlay node 0420, as shown in FIG. 23. If NO in Step 3810, in Step 3850, the cluster node 0410 sends threshold 5 to all the overlay nodes 0420, so that only a GNS namespace portion having a higher access frequency than threshold 5 can be migrated back to the cluster layer 0430.

Referring back to FIG. 37, in Step 3760, the cluster node 0410 synchronizes the namespace migration with other cluster nodes.

Referring back to FIG. 36, after Step 3618, in Step 3619, the cluster node 0410 decreases the monitoring period for Step 1710, and checks again whether the average total workload of all the overlay nodes 0420 at the consistent hashing overlay layer 0440 (layer 2) is greater than threshold 2. If YES, in Step 3614, the cluster node 0410 starts the process to add new overlay nodes to the consistent hashing overlay layer 0440, as shown in FIG. 20. If NO in Step 3615, in Step 3620, the cluster node 0410 increases the monitoring period for Step 1710.

Figure 39:
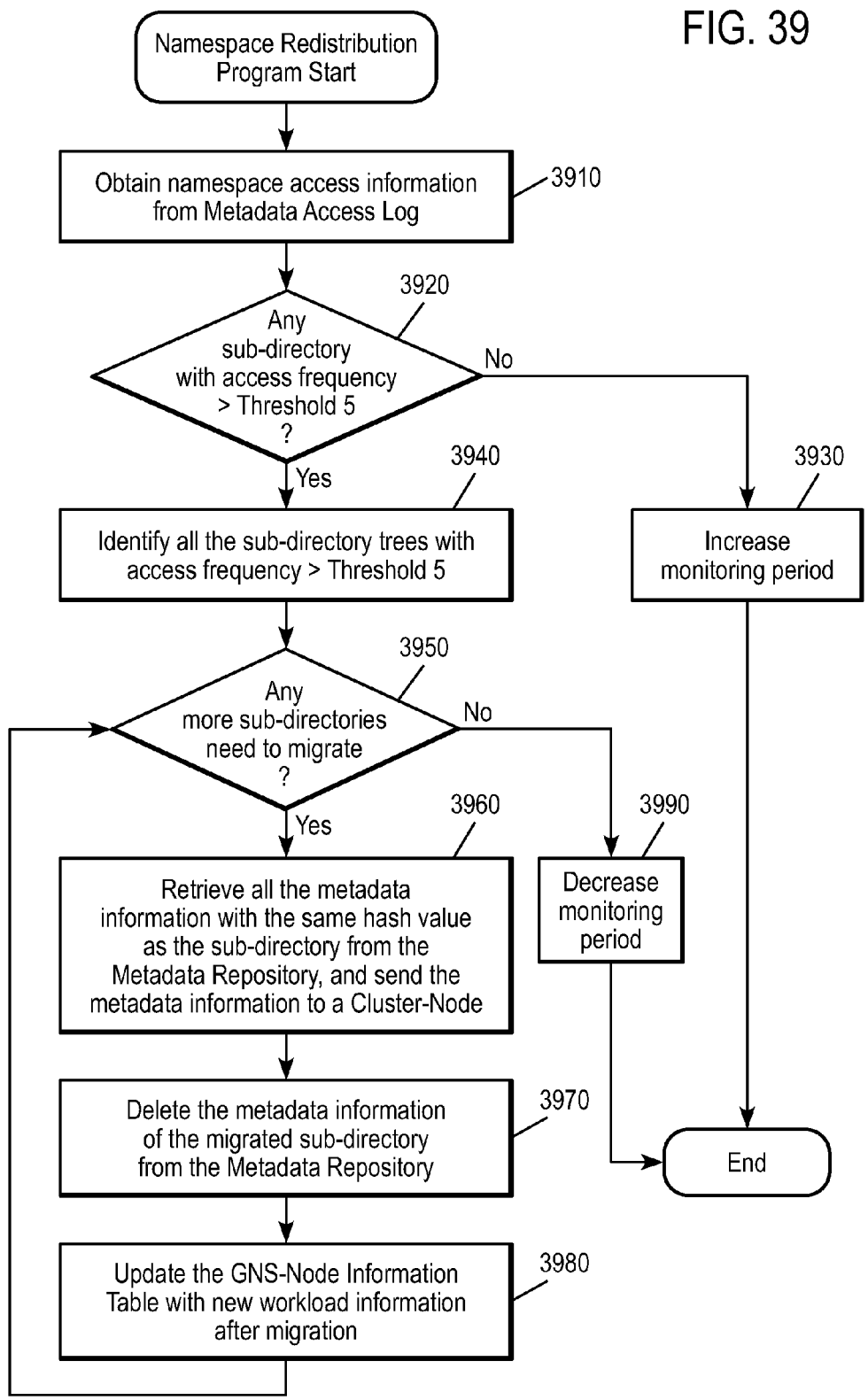
FIG. 39 is a flow diagram illustrating exemplary steps of a namespace redistribution program performed at an overlay node.

FIG. 39 is a flow diagram illustrating exemplary steps of the namespace redistribution program 0263 at an overlay node 0420 according to this embodiment. In Step 3910, the overlay node 0420 obtains the namespace access information from the metadata access log 0245. In Step 3920, the overlay node 0420 checks whether any sub-directory has a higher access frequency than threshold 5. If NO, in Step 3930, the overlay node 0420 increases the monitoring period for Step 1710. If YES in Step 3920, in Step 3940, the overlay node 0420 identifies all sub-directory trees having an access frequency higher than threshold 5. In Step 3950, the overlay node 0420 checks whether any more sub-directories need to migrate to the cluster layer 0430. If YES, in Step 3960, the overlay node 0420 retrieves all metadata information with the same hash value as the sub-directory from the metadata repository 0244, and sends the metadata information to the cluster node 0410 with the smallest node ID found in the GNS-node Information Table 0242. In Step 3970, the overlay node 0420 deletes the metadata information of the migrated sub-directory from the metadata repository 0244. In Step 3980, the overlay node 0420 updates the GNS-node information table with new workload information after migration. If NO in Step 3950, in Step 3990, the overlay node 0420 decreases the monitoring period for Step 1710.

Therefore, with this embodiment, the most frequently-accessed GNS namespace is stored in the cluster nodes 0410 at the cluster layer 0430, and the metadata migration and synchronization processes are staggered to avoid a sudden network traffic burst to the cluster layer 0430.

A further modified embodiment will be described in the following. The description will mainly focus on the differences from the above description.

In the above description, a cluster node 0410 can be only at the cluster layer and an overlay node 0420 can be only at the consistent hashing overlay layer 0440. However, when the GNS namespace expands or shrinks, or the workload changes, the number of GNS-nodes 0110 at one layer may become more than is required. In this situation, it may be desirable to change a cluster node 0410 at the cluster layer 0430 to be an overlay node 0420 at the consistent hashing overlay layer 0440, or to change an overlay node 0420 at the consistent hashing overlay layer 0440 to be a cluster node 0410 at the cluster layer 0430, or simply to remove unnecessary GNS-nodes 0110 from either layer.

Figure 40:
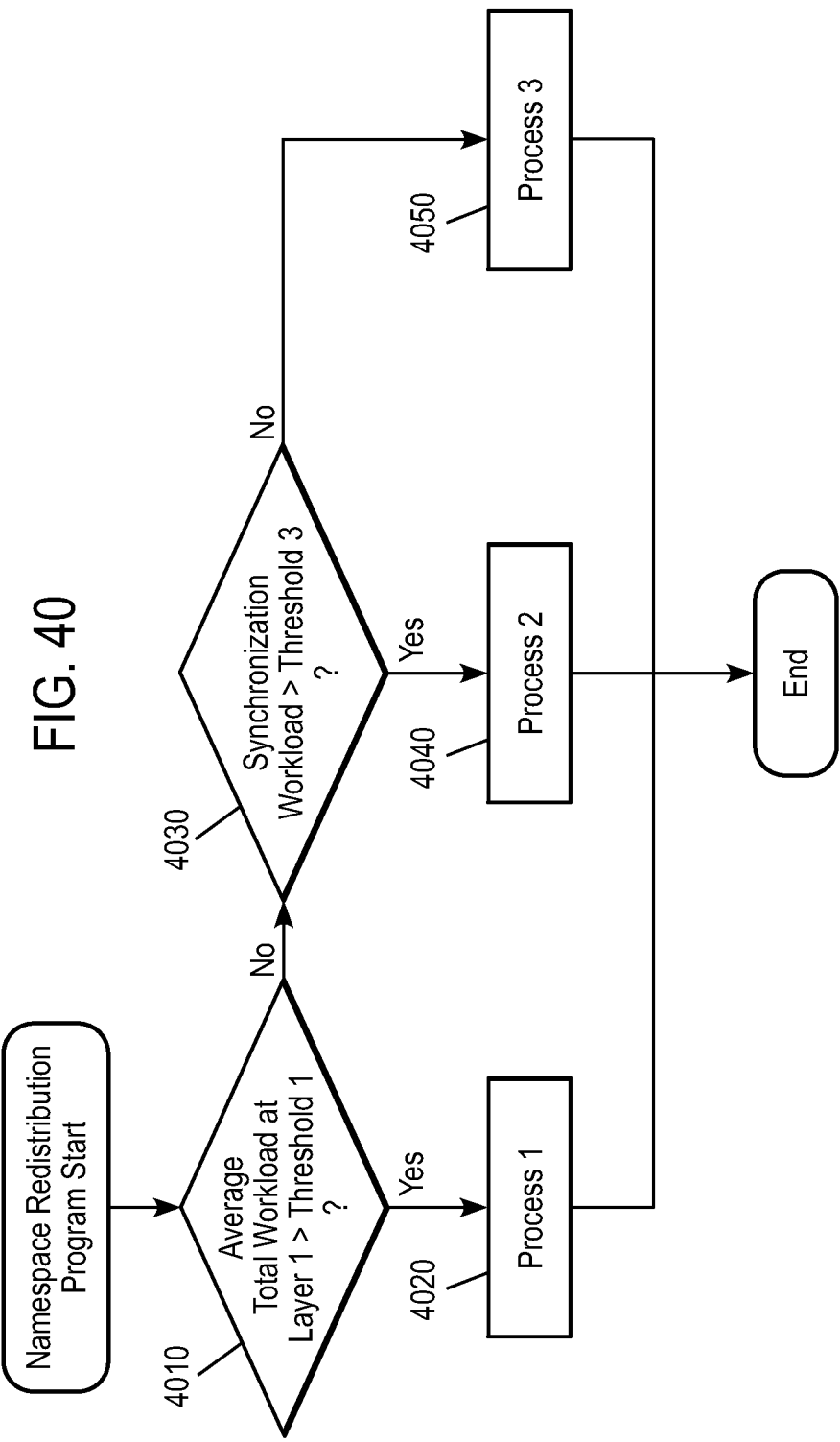
FIG. 40 is a flow diagram illustrating exemplary steps of a namespace redistribution program performed at a cluster node.

FIG. 40 is a flow diagram illustrating exemplary steps of the namespace redistribution program 0263 at a cluster node 0410, in the present modified embodiment. In Step 4010, the cluster node 0410 checks whether the average total workload of all the cluster nodes 0410 at the cluster layer 0430 (layer 1) is greater than threshold 1. If YES, in Step 4020, a process 1 is invoked. If NO in Step 4010, in Step 4030, the cluster node 0410 checks whether its synchronization workload is greater than threshold 3. If YES, in Step 4040, a process 2 is invoked. If NO in Step 4030, in Step 4050, a process 3 is invoked.

Figure 41:
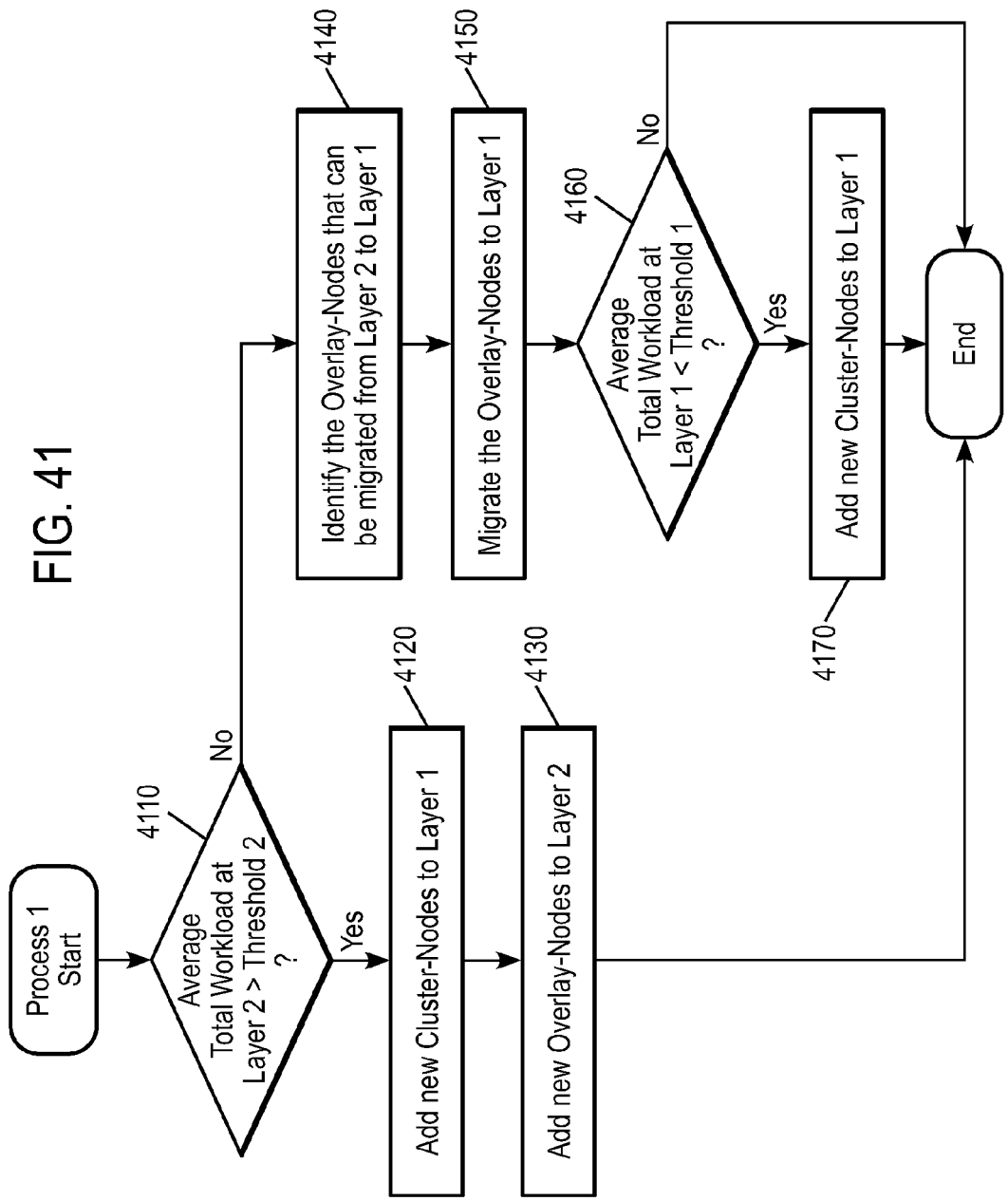
FIG. 41 is a flow diagram illustrating steps of a namespace distribution program performed when the average total workload at a cluster layer is greater than a first predefined threshold.

FIG. 41 is a flow diagram illustrating process 1 (Step 4020). In Step 4110, the cluster node 0410 checks whether the average total workload of all the overlay nodes 0420 at the consistent hashing overlay layer 0440 (layer 2) is greater than threshold 2. If YES, in Step 4120, the cluster node 0410 starts the process to add new cluster nodes 0410 to the cluster layer 0430, as shown in FIG. 19. In Step 4130, the cluster node 0410 starts the process to add new overlay nodes 0420 to the consistent hashing overlay layer 0440, as shown in FIG. 20. If NO in Step 4110, in Step 4140, the cluster node 0410 identifies the overlay nodes 0420 that can be migrated from the consistent hashing overlay layer 0440, so that the average total workload at the consistent hashing overlay layer 0440 is still lower than threshold 2 after migration. In Step 4150, the cluster node 0410 migrates the identified overlay nodes from the consistent hashing overlay layer 0440 to the cluster layer 0430.

Figure 42:
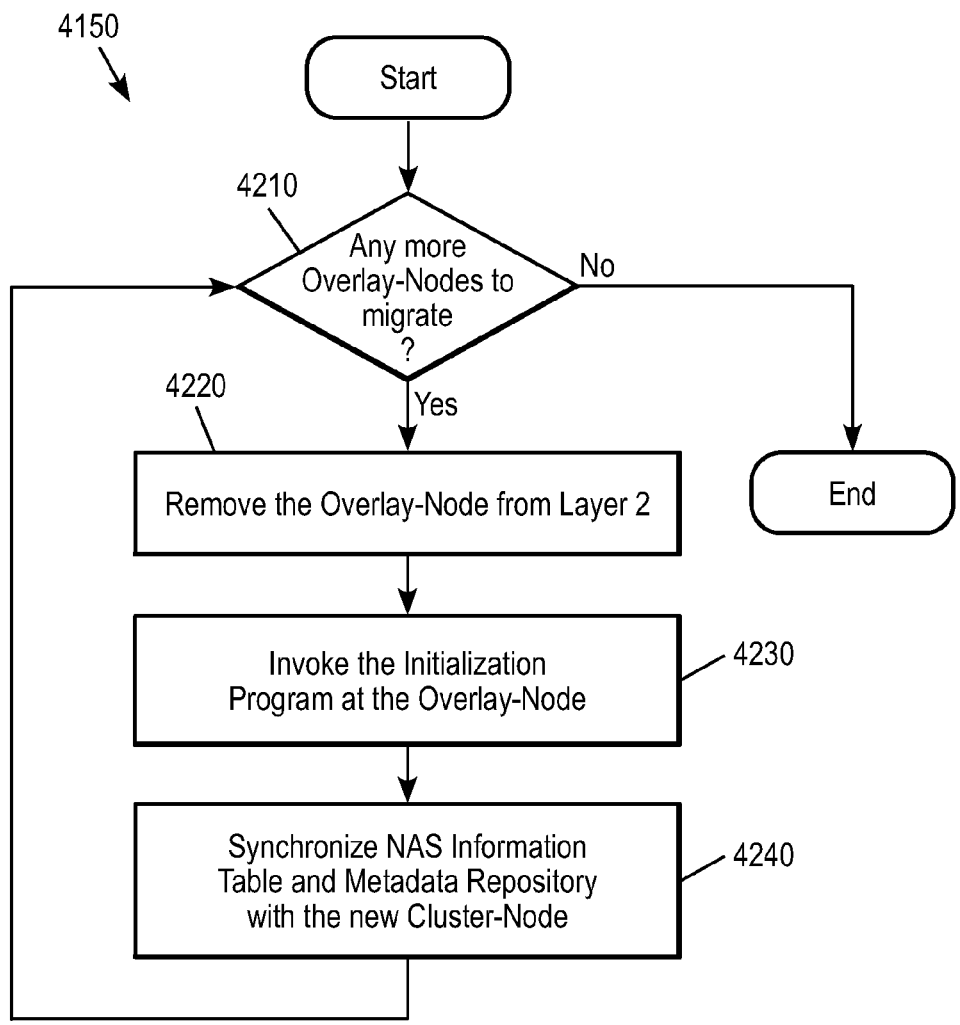
FIG. 42 is a flow diagram illustrating exemplary steps for migrating overlay nodes from a consistent hashing overlay layer to a cluster layer.

FIG. 42 is a flow diagram illustrating exemplary steps constituting Step 4150. In Step 4210, the cluster node 0410 checks whether there are any more overlay nodes 0420 to migrate. If YES, in Step 4220, the cluster node 0410 removes the overlay node 0420 from the consistent hashing overlay layer 0440 (layer 2).

Figure 43:
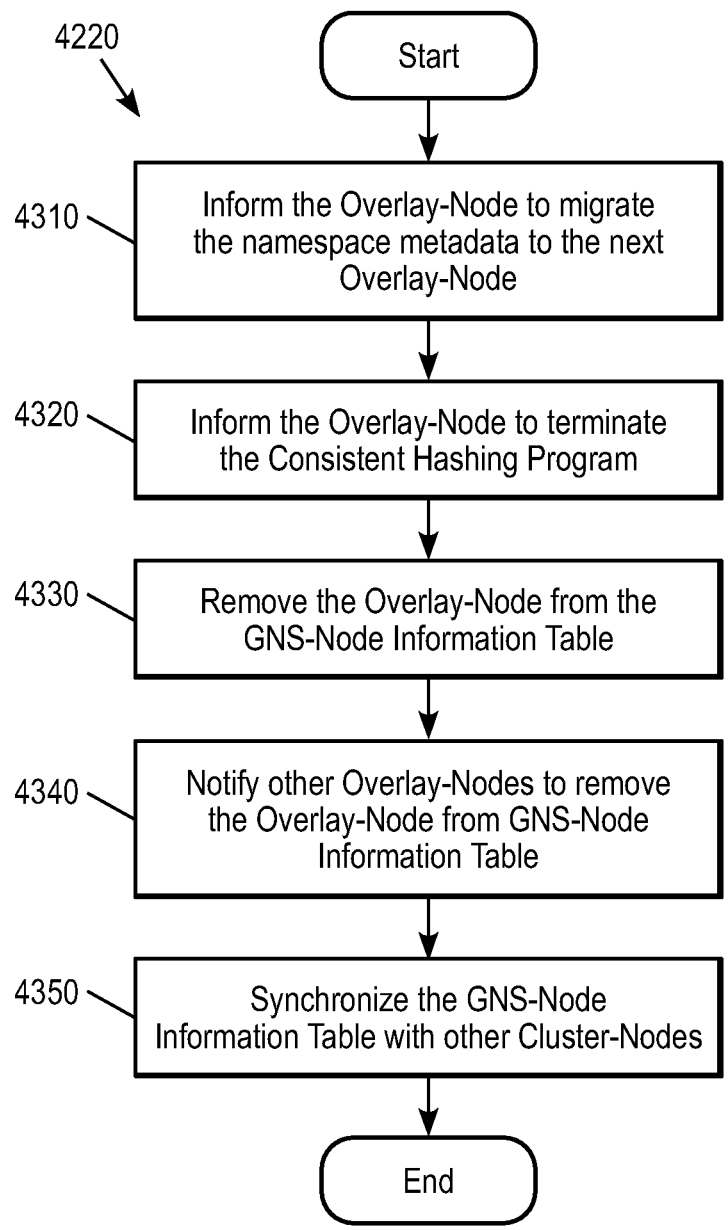
FIG. 43 is a flow diagram illustrating exemplary steps for removing an overlay node from a consistent hashing overlay layer.

FIG. 43 is a flow diagram illustrating exemplary steps constituting Step 4220. In Step 4310, the cluster node 0410 informs the overlay node 0420 to migrate the namespace metadata for which it is responsible to the next overlay node 0420 whose node ID is numerically closest clockwise in the consistent hashing overlay layer 0440. In Step 4320, the cluster node 0410 informs the overlay node 0420 to terminate the consistent hashing Program 0263. In Step 4330, the cluster node 0410 removes the overlay node 0420 from the GNS-node information table 0242. In Step 4340, the cluster node 0410 notifies other overlay nodes 0420 to remove the overlay node 0420 from their GNS-node information tables 0242. In Step 4350, the cluster node 0410 synchronizes its GNS-node information table 0242 with those of other cluster nodes 0410.

Referring back to FIG. 42, in Step 4230, the cluster node 0410 invokes the initialization program 0264 at the overlay node 0420 to join the cluster layer, as shown in FIG. 8. Thereafter, the overlay node 0420 becomes a new cluster node 0410. In Step 4240, the cluster node 0410 synchronizes the NAS information table 0243 and metadata repository 0244 with the new cluster node 0410, and repeats Step 4210 until there are no more overlay nodes 0420 to migrate.

Referring back to FIG. 41, in Step 4160, the cluster node 0410 checks whether the average total workload at the cluster layer is lower than threshold 1 after the overlay node migration in Step 4150. If YES, in Step 4170, the cluster node 0410 starts the process to add new cluster nodes to the cluster layer 0430, as shown in FIG. 19.

Figure 44:
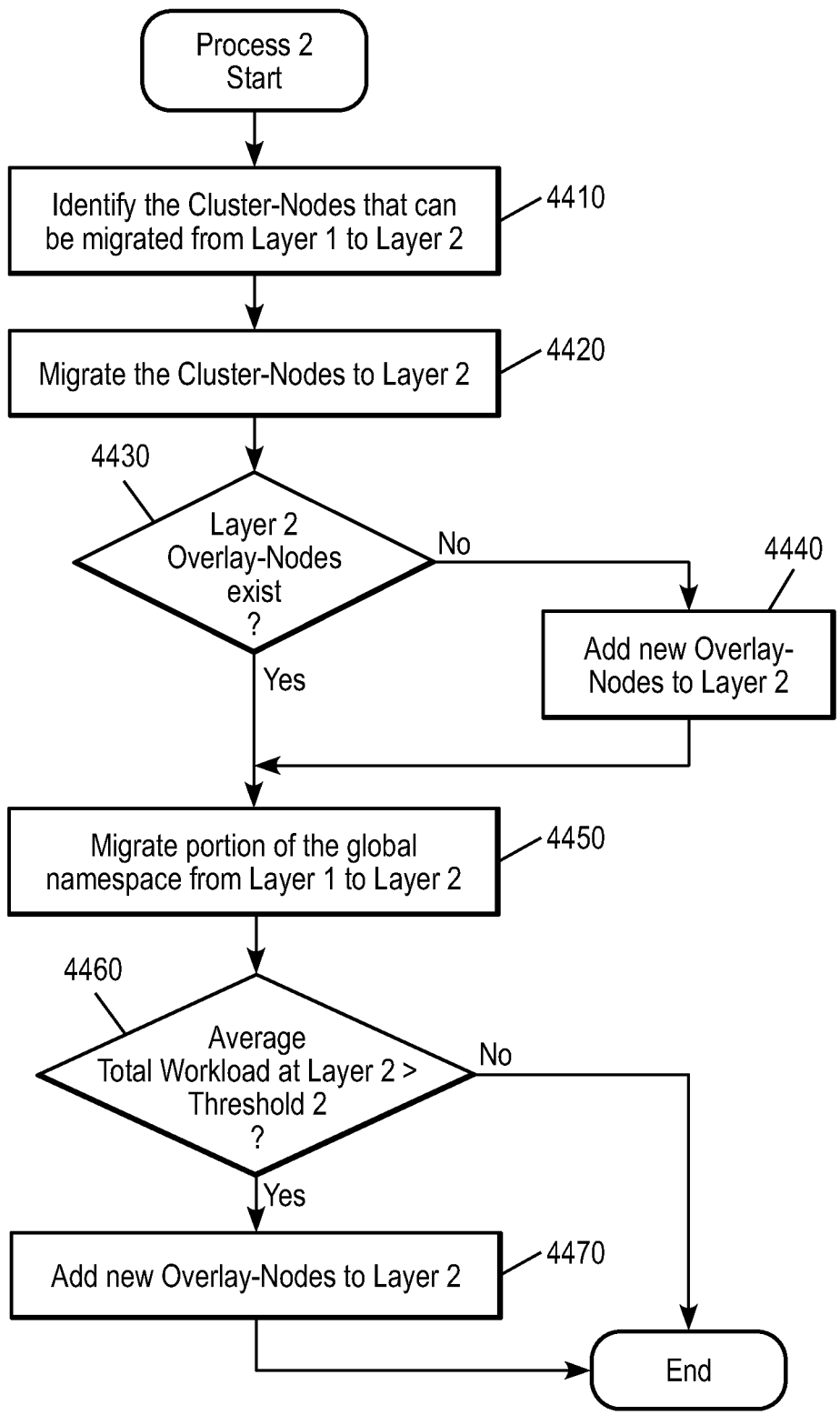
FIG. 44 is a flow diagram illustrating steps of a namespace distribution program performed when the average total workload at a cluster layer is not greater than the first predefined threshold and a synchronization workload is greater than a third predefined threshold.

FIG. 44 is a flow diagram illustrating process 2 (Step 4040). In Step 4410, the cluster node 0410 identifies the cluster nodes 0410 that can be migrated from the cluster layer 0430 to the consistent hashing overlay layer 0440, so that the average total workload at the cluster layer 0430 is still lower than threshold 1 after migration. In Step 4420, the cluster node 0410 migrates the identified cluster nodes from the cluster layer 0430 to the consistent hashing overlay layer 0440.

Figure 45:
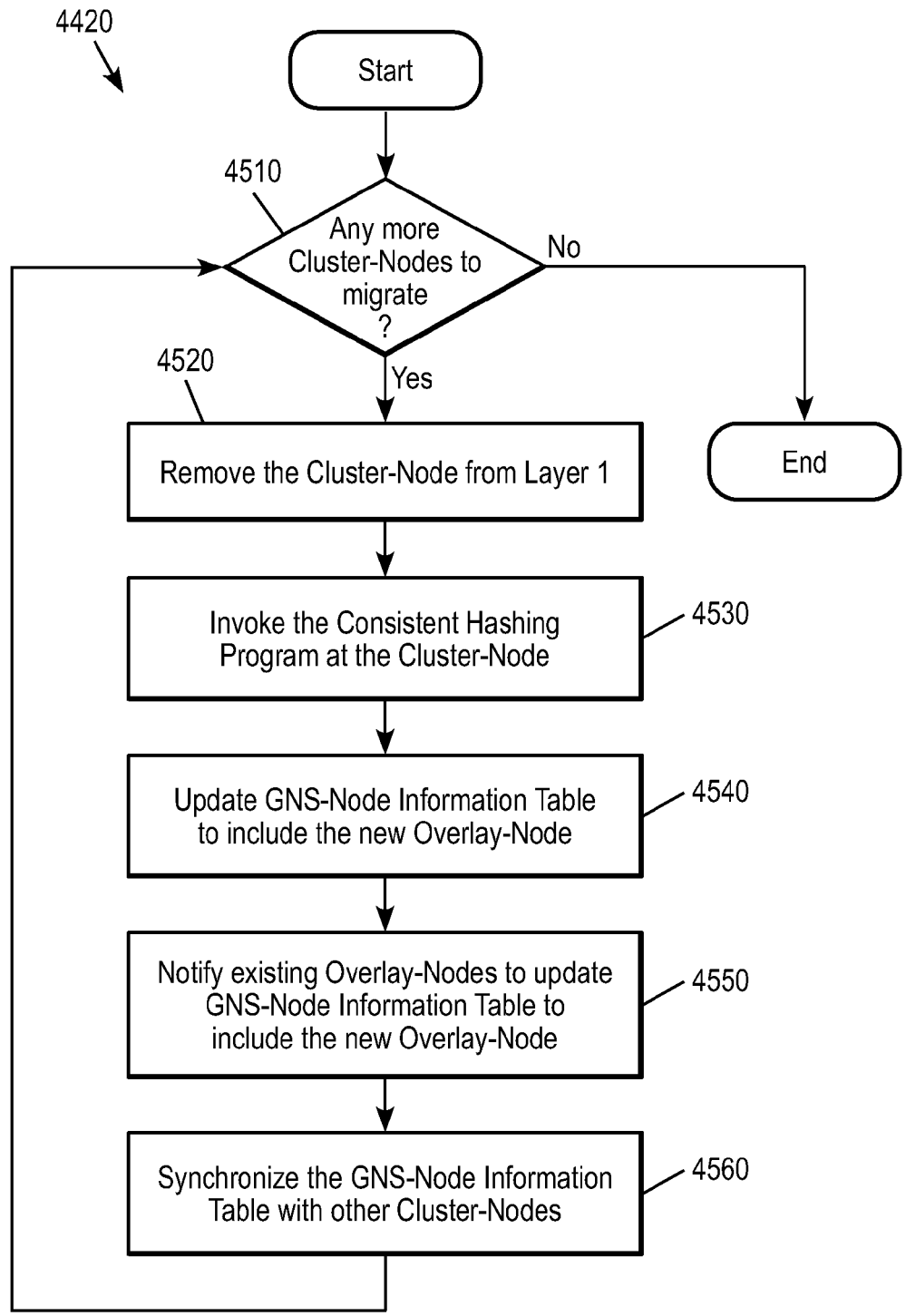
FIG. 45 is a flow diagram illustrating exemplary steps for migrating cluster nodes to a consistent hashing overlay layer.

FIG. 45 is a flow diagram illustrating exemplary steps constituting the Step 4420. In Step 4510, the cluster node 0410 checks whether there are any more cluster nodes 0410 to migrate. If YES, in Step 4520, the cluster node 0410 removes the cluster node 0410 from the cluster layer 0430 (layer 1).

Figure 46:
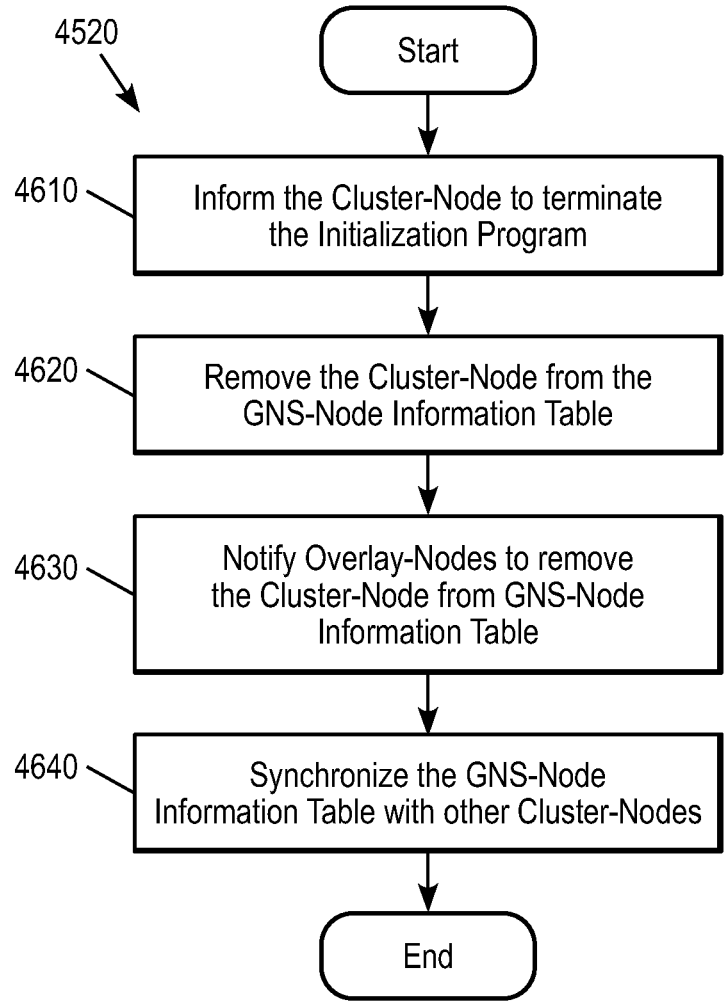
FIG. 46 is a flow diagram illustrating exemplary steps for removing a cluster node from a cluster layer.

FIG. 46 is a flow diagram illustrating exemplary steps constituting the Step 4520. In Step 4610, the cluster node 0410 informs the cluster node 0410 to be migrated to terminate the initialization program 0264. In Step 4620, the cluster node 0410 removes the cluster node 0410 to be migrated from its GNS-node information table 0242. In Step 4630, the cluster node 0410 notifies overlay nodes to remove the cluster node 0410 to be migrated from their GNS-node information tables 0242. In Step 4640, the cluster node 0410 synchronizes its GNS-node information table 0242 with those of other cluster nodes 0410.

Referring back to FIG. 45, in Step 4530, the cluster node 0410 invokes the consistent hashing program 0263 at the cluster node 0410 to be migrated, as shown in FIG. 21. Thereafter, the cluster node 0410 to be migrated becomes a new overlay node 0420. In Step 4540, the cluster node 0410 updates its GNS-node information table 0242 to include the new overlay node 0420. In Step 4550, the cluster node 0410 notifies existing overlay nodes to update their GNS-node information tables 0242 to include the new overlay node 0420. In Step 4560, the cluster node 0410 synchronizes its GNS-node information table 0242 with those of other cluster nodes 0410.

Referring back to FIG. 44, in Step 4430, the cluster node 0410 checks whether any overlay nodes 0420 exist at the consistent hashing overlay layer 0440 (Layer 2). If NO, in Step 4440, the cluster node 0410 starts the process to add new overlay nodes to the consistent hashing overlay layer 0440, as shown in FIG. 20. In Step 4450, the cluster node 0410 starts the process to migrate a portion of the global namespace from the cluster layer 0430 (layer 1) to the consistent hashing overlay layer 0440 (layer 2), as shown in FIG. 22. In Step 4460, the cluster node 0410 checks whether the average total workload of all overlay nodes 0420 at the consistent hashing overlay layer 0440 (layer 2) is greater than threshold 2. If YES, in Step 4470, the cluster node 0410 starts the process to add new overlay nodes to the consistent hashing overlay layer 0440, as shown in FIG. 20.

Figure 47:
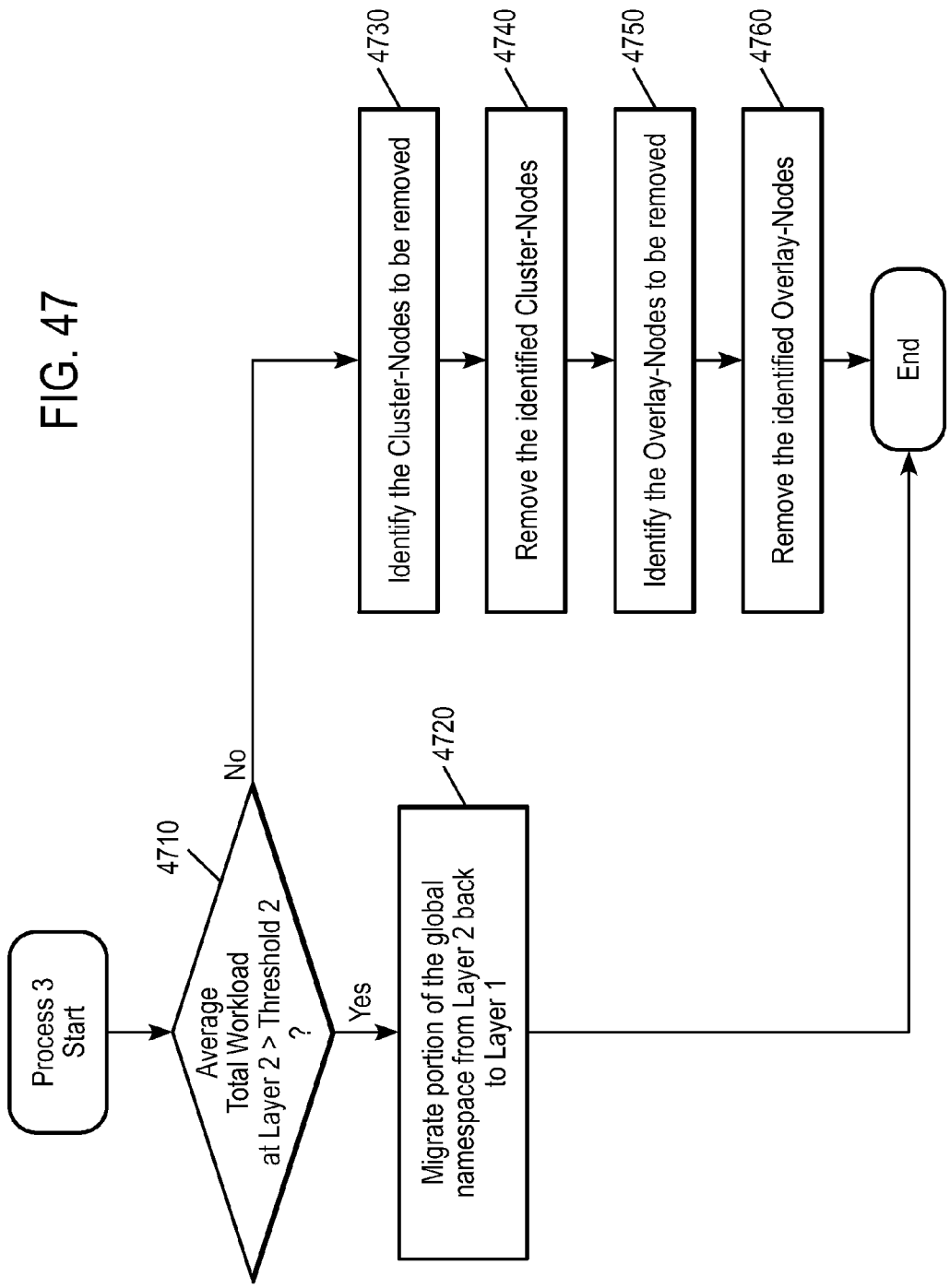
FIG. 47 is a flow diagram illustrating exemplary steps of a namespace distribution program performed when the average total workload at a cluster layer is not greater than the first predefined threshold and a synchronization workload is not greater than the third predefined threshold.

FIG. 47 is a flow diagram illustrating process 3 (Step 4050). In Step 4710, the cluster node 0410 checks whether the average total workload of all overlay nodes 0420 at the consistent hashing overlay layer 0440 (layer 2) is greater than threshold 2. If YES, in Step 4720, the cluster node 0410 migrates a portion of the global namespace from consistent hashing overlay layer 0440 (layer 2) back to the cluster layer 0430 (layer 1), as shown in FIG. 27. If NO in Step 4710, in Step 4730, the cluster node 0410 identifies the cluster nodes 0410 that can be removed from the cluster layer 0430. In Step 4740, the cluster node 0410 removes each of the identified cluster nodes 0410 from the cluster layer 0430, as shown in FIG. 46. In Step 4750, the cluster node 0410 identifies the overlay nodes 0420 that can be removed from the consistent hashing overlay layer 0440. In Step 4760, the cluster node 0410 removes each of the identified overlay nodes 0420 from the consistent hashing overlay layer 0440, as shown in FIG. 43.

Therefore, with this modified embodiment, GNS-nodes 0110 (cluster nodes 0410 and overlay nodes 0420) can also be migrated between the cluster layer 0430 and the consistent hashing overlay layer 0440. The utilization of the GNS-nodes is improved and hence, fewer GNS-nodes are required by the system.

We claim:

1. A method of managing a global namespace (GNS) for a network system including a plurality of network-attached storage (NAS) devices connected together by a network, comprising the steps of:
   organizing a plurality of metadata servers each into one of a cluster layer having a plurality of cluster nodes and a consistent hashing overlay layer having a plurality of overlay nodes,
   constructing a GNS namespace, including steps of creating a GNS hierarchy above share folders of the NAS devices and constructing the GNS hierarchy under the share folders, wherein the creating and constructing steps are performed by a cluster node in the cluster layer,
   synchronizing the constructed GNS namespace across all cluster nodes in the cluster layer,
   setting first and second portions of the GNS namespace to be managed by the cluster layer and consistent hashing overlay layer, respectively, and
   dynamically adjusting at least one of the first and second portions of the GNS namespace to be managed by the cluster layer and consistent hashing overlay layer, respectively, based on workload of the metadata servers,
   wherein the dynamically adjusting step includes the steps of initiating, by a cluster node in the cluster layer, a process to add at least one metadata server to the cluster layer or to the consistent hashing overlay layer when the average total workload in the layer to which at least one metadata server is to be added, defined as the average of the number of namespace access requests in a predefined time period divided by the total number of namespace access requests than can be serviced during the predefined time period by the layer to which at least one metadata server is to be added, exceeds a predefined threshold;
   wherein the dynamically adjusting step further includes the step of initialing, by a cluster node in the cluster layer, a process to shift part of the first portion to the second portion to be managed by the consistent hashing overlay layer, or part of the second portion to the first portion to be managed by the cluster layer, based on the workload of the metadata servers; and
   wherein the dynamically adjusting step further includes the step of changing the metadata format from a first format required by the cluster layer to a second format required by the consistent hashing overlay layer when shifting part of the first portion to the second portion, or changing the metadata format from the second format to the first format when shifting part of the second portion to the first portion.

2. The method of managing a global namespace (GNS) according to claim 1, wherein the process to add at least one metadata server adds at least one cluster node as the metadata server to the cluster layer or at least one overlay node as the metadata server to the consistent hashing overlay layer.

3. The method of managing a global namespace (GNS) according to claim 1, wherein the process to add at least one metadata server migrates at least one cluster node as the at least one metadata server from the cluster layer to the consistent hashing overlay layer when the synchronization workload, defined as the number of namespace synchronization requests in a predefined time period divided by the total number of namespace access requests that can be serviced during the predefined time period by the cluster layer, exceeds a predefined threshold.

4. The method of managing a global namespace (GNS) according to claim 1, wherein the process to add at least one metadata server migrates at least one overlay node from the consistent hashing overlay layer to the cluster layer when the average total workload in the cluster layer, defined as the number of namespace access requests in a predefined time period divided by the total number of namespace access requests that can be serviced during the predefined time period by the cluster layer, is not greater than a predefined threshold.

5. The method of managing a global namespace (GNS) according to claim 1, wherein the initiating step is performed by a cluster node in the cluster layer and each overlay node in the consistent hashing overlay layer.

6. The method of managing a global namespace (GNS) according to claim 1, wherein the initiating step is performed by a cluster node in the cluster layer and each overlay node in the consistent hashing overlay layer.

7. The method of managing a global namespace (GNS) according to claim 1, further comprising the steps of:
accessing the global namespace, including steps of:
submitting, to a cluster node in the cluster layer, a request for access to the global namespace;
if namespace metadata of the request are managed by the cluster node to which the request is submitted, the cluster node services the request;
if namespace metadata of the request have been migrated from the cluster layer to the consistent hashing overlay layer, the cluster node forwards the request to the overlay node to which the namespace metadata was migrated at the consistent hashing overlay layer, and the overlay node to which the request is forwarded services the request.

8. The method of managing a global namespace (GNS) according to claim 7, wherein the node that services the request:
checks whether the request is a read request to read an existing GNS namespace, a create request to create a new GNS path entry, or a migrate request to migrate a file/directory from one NAS device to another, and if the request is a read request, a read-request process is invoked; if the request is a create request, a create-request process is invoked; and if the request is a migrate request, a migrate-request process is invoked;
in the read-request process, retrieves a requested file/directory from a location recorded in the namespace metadata; and responds to the request with the retrieved file/directory;
in the create-request process, obtains a location of a GNS parent directory; checks whether the parent directory is stored in a NAS share folder of a NAS device; if the parent directory is stored in a NAS share folder, creates a file/directory under the parent directory in the NAS share folder; if the parent directory is not stored in a NAS share folder, creates the file/directory in any of the NAS share folders; and creates a GNS namespace entry with a location where the file/directory is created; and
in the migrate-request process, extracts a migration destination location for the migrate request; retrieves a file/directory requested from a requesting location recorded in the namespace metadata; stores the file/directory to the migration destination location; updates the location of the migrated file/directory in the namespace metadata to be the migration destination location; and removes the file/directory from the requesting location.

9. A method of managing a global namespace (GNS) for a network system including a plurality of network-attached storage (NAS) devices connected together by a network, comprising the steps of:
in an initialization phase, creating a cluster layer of cluster nodes, each cluster node having a GNS-node information table and a NAS information table, obtaining a node ID for each cluster node and entering the node ID of each cluster node into its GNS-node information table, and synchronizing the GNS-node information tables of the cluster nodes;
in a namespace construction phase, gathering information of NAS nodes into the NAS information tables, creating a GNS hierarchical namespace above NAS shares, constructing the GNS hierarchical namespace below the NAS shares, and synchronizing the NAS information tables of the cluster nodes;
in a workload monitoring phase, updating workload information in the GNS-node information tables, gathering workload information from a consistent hashing overlay layer, updating the GNS-node information table, and synchronizing the GNS-node information tables of the cluster nodes; and
in a namespace redistribution phase, when the average total workload of the cluster nodes is greater than a predefined first threshold, adding at least one new cluster node to the cluster layer; when the average total workload of the consistent hashing overlay layer is greater than a predefined second threshold, adding at least one new overlay node to the consistent hashing overlay layer; when the synchronization workload of a cluster node is greater than a predefined third threshold, migrating at least one cluster node to the consistent hashing overlay layer; and when the total average workload in the cluster layer is not greater than a predefined fourth threshold, migrating at least one overlay node to the cluster layer.

10. The method of managing a global namespace (GNS) according to claim 9, wherein a cluster node in the cluster layer determines whether the synchronization workload of a cluster node is greater than the predefined third threshold and whether the total average workload in the cluster layer is not greater than the predefined fourth threshold.

11. The method of managing a global namespace (GNS) according to claim 9, wherein a cluster node in the cluster layer and each overlay node in the consistent hashing overlay layer determines whether the synchronization workload of a cluster node is greater than the predefined third threshold and whether the total average workload in the cluster layer is not greater than the predefined fourth threshold.

12. The method of managing a global namespace (GNS) according to claim 9, wherein the steps of migrating at least one cluster node from the cluster layer to the consistent hashing overlay layer and migrating at least one overlay node from the consistent hashing layer to the cluster layer further include the steps, of changing the metadata format from a first format required by the cluster layer to a second format required by the consistent hashing overlay layer and changing the metadata format from the second format to the first format, respectively.

13. A network system including a plurality of cluster nodes in a cluster layer and a plurality of overlay nodes in a consistent hashing overlay layer, the cluster layer and consistent hashing overlay layer being connected together and to a plurality of NAS devices via a network, wherein:

each cluster node and each overlay node includes a processor, a network interface via which the cluster node is coupled to the network, an NFS/CIFS protocol module, a storage management module, a storage interface, a system memory, and a system bus via which the processor is coupled to each of the network interface, the NFS/CIFS protocol module, the storage management module, the storage interface, and the system memory, wherein the processor executes:

an initialization program, in an initialization phase, creating a cluster layer of cluster nodes, each cluster node having a GNS-node information table and a NAS information table, obtaining a node ID for each cluster node and entering the node ID of each cluster node into its GNS-node information table, and synchronizing the GNS-node information tables of the cluster nodes;

a namespace construction program, in a namespace construction phase, gathering information of NAS nodes into the NAS information tables, creating a GNS hierarchical namespace above NAS shares, constructing the GNS hierarchical namespace below the NAS shares, and synchronizing the NAS information tables of the cluster nodes;

a workload monitoring program, in a workload monitoring phase, updating workload information in the GNS-node information tables, gathering workload information from a consistent hashing overlay layer, updating the GNS-node information table, and synchronizing the GNS-node information tables of the cluster nodes; and a namespace redistribution program, in a namespace redistribution phase, when the average total workload of the cluster nodes is greater than a predefined first threshold, adding at least one new cluster node to the cluster layer, when the average total workload of the consistent hashing overlay layer is greater than a predefined second threshold, adding at least one new overlay node to the consistent hashing overlay layer; when the synchronization workload of a cluster node is greater than a predefined third threshold, migrating at least one cluster node to the consistent hashing overlay layer; and when the total average workload in the cluster layer is not greater than a predefined fourth threshold, migrating at least one overlay node to the cluster layer.

14. The network system according to claim 13, wherein a cluster node in the cluster layer determines whether the synchronization workload of a cluster node is greater than the predefined third threshold and whether the total average workload in the cluster layer is not greater than the predefined fourth threshold.

15. The network system according to claim 13, wherein a cluster node in the cluster layer and each overlay node in the consistent hashing overlay layer determines whether the synchronization workload of a cluster node is greater than the predefined third threshold and whether the total average workload in the cluster layer is not greater than the predefined fourth threshold.

16. The network system according to claim 13, wherein migrating at least one cluster node to the consistent hashing overlay layer and migrating at least one overlay node to the cluster layer further include changing the metadata format from a first format required by the cluster layer to a second format required by the consistent hashing overlay layer and changing the metadata format from the second format to the first format, respectively.

\* \* \* \* \*